(12) United States Patent
Tuyls et al.

(10) Patent No.: US 7,993,049 B2
(45) Date of Patent: Aug. 9, 2011

(54) TURNTABLE FOR ON-DEMAND MIXING AND DISTRIBUTING OF A FOOD PRODUCT

(75) Inventors: James M. Tuyls, Vacaville, CA (US); Antonio J. Jepson, Dixon, CA (US); Donald A. Klotz, Vacaville, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 423 days.

(21) Appl. No.: 12/253,188

(22) Filed: Oct. 16, 2008

(65) Prior Publication Data

US 2010/0097880 A1   Apr. 22, 2010

(51) Int. Cl.
*A21C 9/00* (2006.01)
(52) U.S. Cl. .......................................... 366/69; 366/213
(58) Field of Classification Search .............. 366/69–99, 366/208–218, 349
See application file for complete search history.

(56) References Cited

U.S. PATENT DOCUMENTS

| | | |
|---|---|---|
| 577,362 A | 2/1897 | Ettlinger |
| 1,133,711 A | 3/1915 | Cornelius |
| 1,239,373 A | 9/1917 | Farmer et al. |
| 2,609,240 A | 9/1952 | Faukner et al. |
| 2,900,851 A | 8/1959 | Rutledge |
| 2,944,743 A | 7/1960 | Kachergis |
| 3,121,449 A | 2/1964 | Marchadour |
| 3,601,845 A | 8/1971 | Mavrich |
| 3,631,818 A | 1/1972 | Zito |
| 3,717,752 A * | 2/1973 | Warning ........................ 239/654 |
| 3,725,974 A | 4/1973 | Kuhlman |
| 3,868,048 A | 2/1975 | Soodalter |
| 3,881,654 A | 5/1975 | Larkin |
| 4,112,834 A | 9/1978 | Thiry |
| 4,211,345 A | 7/1980 | Taubenmann |
| 4,236,672 A | 12/1980 | Koeberle |
| 4,293,010 A | 10/1981 | Winiasz |
| 4,633,623 A | 1/1987 | Spitz |
| 4,688,720 A | 8/1987 | MacDonald et al. |
| 4,691,625 A | 9/1987 | Blain et al. |
| 4,700,899 A | 10/1987 | Powers et al. |
| 4,801,097 A | 1/1989 | Fitch, Jr. |
| 5,050,805 A | 9/1991 | Lloyd et al. |

(Continued)

FOREIGN PATENT DOCUMENTS

JP            04-281734 A      10/1992

(Continued)

OTHER PUBLICATIONS

International Preliminary Report on Patentability and Written Opinion of the International Searching Authority of Apr. 28, 2011.

*Primary Examiner* — Charles E Cooley
(74) *Attorney, Agent, or Firm* — Kilpatrick Townsend & Stockton LLP

(57) ABSTRACT

An apparatus for mixing and distributing sauce is disclosed. The apparatus may include a mixing-pump device coupled a linear arm for distributing sauce over a rotating turntable. The turntable may include an improved gripping device for coupling to a pan. The apparatus may also include a self-expelling concentrated sauce vat which couples to the mixing-pump device. The apparatus may also include a self-expelling concentrated sauce cassette which couples to the mixing-pump device.

16 Claims, 28 Drawing Sheets

U.S. PATENT DOCUMENTS

| | | | |
|---|---|---|---|
| 5,092,229 | A | 3/1992 | Chen |
| 5,283,990 | A | 2/1994 | Shank, Jr. |
| H1379 | H | 12/1994 | Meuer |
| 5,400,700 | A | 3/1995 | Bois |
| 5,407,102 | A | 4/1995 | Freudinger et al. |
| 5,429,039 | A | 7/1995 | Chang |
| 5,494,828 | A | 2/1996 | Leopando |
| 5,643,075 | A | 7/1997 | Lygum |
| 5,701,805 | A | 12/1997 | Sa |
| 5,727,448 | A | 3/1998 | Sa |
| 5,768,976 | A | 6/1998 | Suk |
| 5,839,357 | A | 11/1998 | Ha et al. |
| RE36,178 | E | 4/1999 | Freudinger et al. |
| 6,032,610 | A | 3/2000 | Fitch et al. |
| 6,135,012 | A | 10/2000 | Kao |
| 6,259,068 | B1 | 7/2001 | Barrow |
| 6,283,015 | B1 | 9/2001 | Kwon et al. |
| 6,325,016 | B1 | 12/2001 | Fitch et al. |
| 6,357,669 | B1 | 3/2002 | Goenka et al. |
| 6,450,361 | B1 | 9/2002 | Mendelson et al. |
| 6,526,874 | B1 | 3/2003 | Khatchadourian et al. |
| 6,545,252 | B2 | 4/2003 | Wang |
| 6,626,996 | B1 * | 9/2003 | Amigh et al. ............... 118/681 |
| 6,629,493 | B1 | 10/2003 | Schaible et al. |
| 6,705,209 | B2 | 3/2004 | Yang et al. |
| 6,892,629 | B2 * | 5/2005 | Tuyls et al. ............... 99/450.1 |
| 6,892,901 | B2 * | 5/2005 | Tuyls et al. ............... 222/63 |
| 6,969,015 | B1 | 11/2005 | Salmela |
| 6,998,582 | B1 * | 2/2006 | Maroti ............... 219/451.1 |
| 7,074,277 | B2 * | 7/2006 | Tuyls et al. ............... 118/663 |
| 2003/0159596 | A1 * | 8/2003 | Tuyls et al. ............... 99/468 |
| 2003/0160069 | A1 * | 8/2003 | Tuyls et al. ............... 222/309 |
| 2003/0161947 | A1 * | 8/2003 | Tuyls et al. ............... 427/240 |
| 2003/0209194 | A1 * | 11/2003 | Amigh et al. ............... 118/24 |
| 2006/0003065 | A1 | 1/2006 | Kateman |
| 2010/0095884 | A1 * | 4/2010 | Tuyls et al. ............... 118/24 |
| 2010/0095887 | A1 * | 4/2010 | Brodsky et al. ............... 118/663 |
| 2010/0097880 | A1 * | 4/2010 | Tuyls et al. ............... 366/93 |
| 2010/0097881 | A1 * | 4/2010 | Tuyls et al. ............... 366/134 |

FOREIGN PATENT DOCUMENTS

WO    WO 2010045186 A2 *    4/2010

* cited by examiner

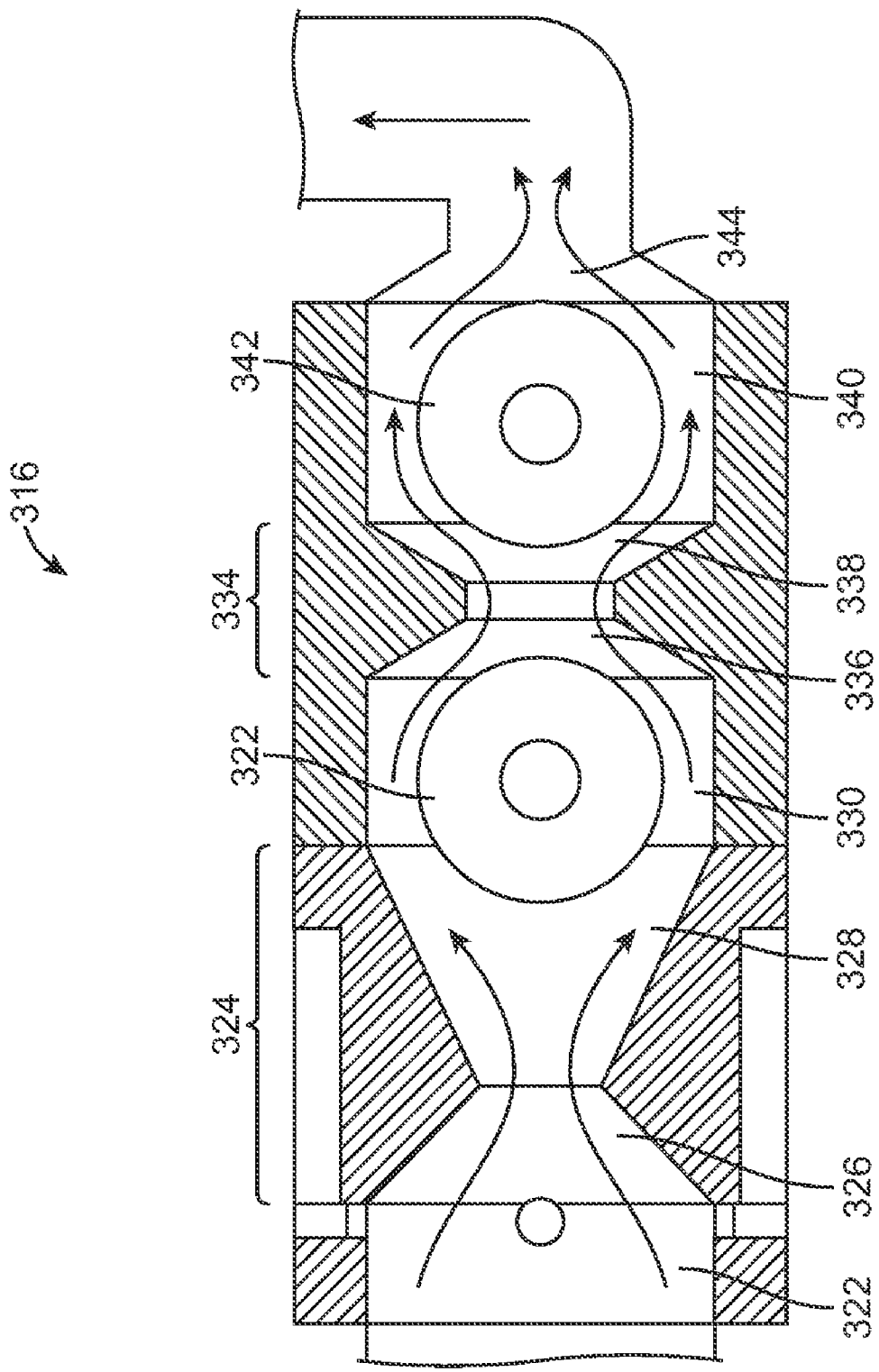

TURNTABLE FOR ON-DEMAND MIXING AND DISTRIBUTING OF A FOOD PRODUCT

FIELD OF THE INVENTION

The present invention relates generally to a mixing and dispensing apparatus.

BACKGROUND OF THE INVENTION

Pizza preparation devices currently provide automated pizza sauce dispensing onto pizza dough. Prior devices use a premixed sauce which often needs replacing, for example when the sauce is used up, or when a different sauce thickness is required. Thus in order to prepare a variety of pizzas, a different dedicated apparatus must exist for each different variety of pizza. Alternatively, one or a few dispensing apparatuses may be used, but must be prepared and initialized for each variety of pizza. In both cases, changing pizza varieties adds in cost, required space, or down time, all of which are undesirable consequences of changing sauce varieties.

Prior devices also do not feature robust apparatuses to latch onto or capture a pizza pan. Thus, prior devices may break during the normal course of use, and be unusable for a period of time, resulting in a loss of production.

BRIEF SUMMARY OF THE INVENTION

One embodiment of the invention may include an apparatus for mixing and dispensing a food-liquid, including a mixing device including a first inlet for a food-product, a second inlet for a second diluting liquid, a first mixing chamber for mixing the food-product and the diluting liquid into a mixed liquid, and a mixer outlet for expelling the mixed liquid, a pump device including a pump inlet in fluid communication with the mixer outlet, and a pump outlet, wherein the pump device includes a variable internal volume, that when increased a corresponding negative pressure draws the mixed liquid into the pump device through the pump inlet, and when decreased a corresponding positive pressure expels the mixed liquid out of the pump device through the pump outlet.

In one aspect the apparatus may additionally include a first valve in one-way fluid communication from the mixer outlet to the chamber inlet, wherein fluid communication from the chamber inlet to the mixer outlet is prevented.

In one aspect the apparatus may additionally include a second valve in one-way fluid communication from the pump device to the chamber outlet, wherein fluid communication from the chamber outlet to the pump device is prevented.

In one aspect the mixing device may additionally include a first venturi device between the first or second inlet and the first mixing chamber, for increasing and decreasing velocity between the first or second inlet and the first mixing chamber.

In one aspect the angle of entry into the first venturi device may be greater than the angle of exit.

In one aspect the first mixing chamber may additionally include a first mixing element, wherein the first mixing element is static within the first mixing chamber and reduces a portion of the central volume of the first mixing chamber.

In one aspect of the first mixing element may be spherical in shape.

In one aspect the mixing device may additionally include a second mixing chamber, located between the first mixing chamber and the mixer outlet.

In one aspect the mixing device may additionally include a second venturi device, the second venturi device located between the first and second mixing chamber, for increasing and decreasing velocity between the first and second mixing chamber.

In one aspect the angle of entry into the second venturi device may be the same as the angle of exit.

In one aspect the second mixing chamber may additionally include a second mixing element, wherein the second mixing element is static within the second mixing chamber and reduces a portion of the central volume of the second mixing chamber.

In one aspect the second mixing element may be spherical in shape.

In one aspect the mixing device may additionally include a third venturi device located between the first mixing chamber and the mixer outlet, for increasing velocity between the first mixing chamber and the mixer outlet.

In one aspect the pump device may include a cylinder, and the variable internal volume is changed by a piston which is slidably housed with the cylinder.

In one aspect the piston may be attached to a shaft which is driven by a stepper motor.

In one aspect the cylinder may be set to a 30° angle relative to the ground, and wherein the chamber inlet is located at the bottom of the cylinder.

In one aspect the piston may be driven from the top of the cylinder.

In one aspect the pump device may additionally include a vacuum sensor for detecting the amount of pressure within the storage chamber.

In one aspect the apparatus may additionally include a pressure regulator for regulating the pressure of the diluting-liquid into the second inlet.

In one aspect the pressure regulator may be adjustable for changing the ratio of food-product to diluting-liquid.

In one aspect the ratio may be 2:1 respectively.

In one aspect the apparatus may additionally include a solenoid valve for switching the flow between the pressure regulator and second inlet on and off.

In one aspect the solenoid valve may be switched off when a vacuum in the pump device is above a preset level.

Another embodiment of the invention may include a cassette for supplying a viscous food product, including a cassette which is reusable and attachable to a pump device, a pliable container detachably connected to the cassette, the pliable container containing a food product which is sauce-like and has a tendency to adhere to the interior surface of the pliable container, the pliable container including an outlet which at the bottom of the pliable container and is connectable to a pump inlet of the pump device; and a dispensing device slidably attached to the cassette and slidably coupled to the exterior of the pliable container, wherein as the dispensing device is initially coupled to the top of the pliable container and slides towards the outlet as the food product is expelled.

In one aspect the cassette may have the structure of a suitcase-like box.

In one aspect the cassette may include a first box-half and a second-box half which are connected by at least one hinge.

In one aspect the first box-half may include handles on the exterior surface.

In one aspect the second box-half may include a through-hole for the outlet.

In one aspect the second box-half may include a hanging device for supporting the weight of the cassette when connected to the pump device.

In one aspect the second box-half may include a flat outer surface that mates with an outer surface of the pump device.

In one aspect the pliable container may be a plastic bag.

In one aspect the plastic bag may be detachably connected to the cassette at the top portion of the bag, opposite to the outlet.

In one aspect the dispensing device may additionally include at least two parallel rollers, each of which is connected to respective sliders at each end of the rollers.

In one aspect the pliable container may be pinched between the rollers.

In one aspect the rollers may be weighted to sufficiently expel the remaining contents of food product which adhere to the interior of the pliable container.

In one aspect the rollers may weigh in the range of 6-8 pounds each.

In one aspect each slider may include a slider block slidably attached to a guide shaft, which is attached to the cassette.

In one aspect the cassette may additionally include a compression device attached to the cassette, wherein the compression device couples to a bottom portion of the pliable container.

In one aspect the compression device may include spring members which compress the bottom portion of the pliable container.

Yet another embodiment of the invention may include a vat for supplying a viscous food product, including a vat which is reusable and for containing a food product which is sauce-like and has a tendency to adhere to the interior surface of the vat, the vat including a loadable top-section, a uniform mid-section, and a bottom-section which reduces in size to an outlet at the bottom-most portion of the bottom section, a float for insertion into the vat and floatation on top of the food product, the float having a width and depth which are close to the interior dimensions of the mid-section to scrape food product adhering to the surface of the vat to the outlet, the float having a depth which reduces in size to match the bottom-section dimensions of the vat, an output tube attached to the outlet, the output tube attachable to an input tube of a pump device; and a frame which detachably supports the vat, and is attachable to the frame of the pump device.

In one aspect the top-section may include a vat cover.

In one aspect the top-section and mid-section may be substantially rectangular in shape, and the bottom-section reduces to a pyramid shape.

In one aspect the float may reduce to a pyramid shape.

In one aspect the float may include a hooking point to aid in removal from the bottom of the vat.

In one aspect the output tube may include a straining device.

In one aspect the frame may couple to the vat from the mid-section to the bottom-section.

In one aspect the frame may also couple to the output tube.

In one aspect the frame may include a hanging device for supporting the weight of the vat when connected to the pump device.

Yet another embodiment of the invention may include a turntable for rotating dough, including a circular turntable base, the turntable base having a bottom-side, and a top-side, and three slots axially extending from the center of the turntable base, a center mount boss attached to the center of the bottom side, a drive hub plate rotationally attached to the center mount boss and parallel to the turntable, the drive hub plate having three hub plate holes, three spring linkages, each rotationally coupled to respective hub plate holes at a first end, each linkage including a linkage hole at a second end, three gripper linkages, each being elongated and having a near-end and a far-end, with the near-ends located at respective hub plate holes, and including a linkage-mount which springingly mates with respective linkage holes such that a leveraging force is placed onto the far ends, three grippers, each being elongated, each having a gripper-end and a connector-end, the connector-end connected to respective far-ends, the gripper ends slidably located within respective slots, three ramp stops, each being ramp shaped, each being mounted on the bottom-side, wherein when the drive hub plate rotates to a first position each gripper rides up a respective ramp stop and is stopped such that the gripper-end does not protrude through the top-side, and when the drive hub plate rotates to a second position each gripper rides down such that the gripper-end protrudes from the top-side.

In one aspect the three axial slots may be circumferentially distributed and pass through the turntable base.

In one aspect the slots may be 120 degrees apart.

In one aspect the three hub plate holes may be arranged in a bolt circle pattern about the center mount boss.

In one aspect the three hub plate holes may be 120 degrees apart.

In one aspect the axis of the linkage holes may be parallel to the turntable base.

In one aspect each linkage mount may be located between respective near-ends and far-ends.

In one aspect each gripper linkage may additionally include spring members coupled between respective near-ends and hub plate holes.

In one aspect each spring member may place expansive force between respective near-ends and hub plate holes.

In one aspect each gripper may include a cross section that is dimensioned to freely pass through the slots.

In one aspect each gripper may be positioned to be substantially perpendicular to the turntable base.

In one aspect each ramp stop may be at least partially slotted to match the dimensions of the slots.

In one aspect each ramp may be positioned near the outermost portion of the turntable base and at an end of a slot.

In one aspect each ramp may have an incline which begins nearer the center of the turntable.

In one aspect when all three grippers are in the second position, the grippers may couple to a pizza pan.

In one aspect the grippers may additionally position to at least 4 different sizes of pizza pans.

Yet another embodiment of the invention may include a method for electronically distributing pizza sauce over pizza dough, the method including retrieving individual parameters from a control board according to an initiation to dispense sauce over pizza dough, accelerating a turntable to a first rotational speed, moving an arm including a sauce dispenser to a first position, dispensing sauce from the arm including the sauce dispenser at a first dispensing rate over the outer diameter area of a pizza dough which is rotating on the turntable at the first rotational speed, and simultaneously moving the arm including the sauce dispenser from the outer diameter area of the pizza dough to the inner diameter area at an accelerated rate, dispensing sauce at a decelerated dispensing rate, and accelerating the turntable from the first rotational speed to a second rotational speed.

In one aspect the sauce dispenser may move in a linear direction over the turntable.

In one aspect the individual parameters may be either preset or calculated.

In one aspect the individual parameters may include at least one or more of pump parameters, turntable parameters, arm parameters, pattern parameters, and runtime parameters.

In one aspect the pump parameters may include at least one or more of total sauce amount, pump outer diameter speed, pump start speed after sauce has been distributed on the outer diameter, pump deceleration after sauce has been distributed on the outer diameter, and pump outer diameter distance.

In one aspect the turntable parameters may include at least one or more of maximum turntable speed, turntable outer diameter speed, turntable acceleration, and turntable outer diameter distance.

In one aspect the arm parameters may include at least one or more of arm start position, arm start speed, arm acceleration, and arm outer diameter distance.

In one aspect the pattern parameters may include at least one or more of arm start position adjustment on more sauce, arm start speed adjustment for more sauce, and arm start speed adjustment for less sauce.

In one aspect the runtime parameters may include at least one or more of less sauce than a normal amount, and more sauce than a normal amount.

Yet another embodiment of the invention may include a method for electronically distributing pizza sauce over pizza dough, the method including receiving a user selection from a user interface for a pizza size, receiving a user selection from a user interface for a pizza type, retrieving preset arm, pump, and turntable parameters from memory on a control board according to the selected pizza size and pizza type, moving an arm with a sauce dispenser to a start position, moving a pump to a home position, accelerating a turntable to a first rotational speed, moving the pump to distribute sauce from the sauce dispenser at a first dispensing rate over the outer diameter area of a pizza dough which is rotating on the turntable at the first rotational speed, and simultaneously moving the sauce dispenser from the outer diameter of the pizza dough to the inner diameter area at an accelerated moving rate, dispensing sauce at a decelerated dispensing rate, and accelerating the turntable from the first rotational speed to a second rotational speed.

In one aspect the pump parameters may include at least one or more of total sauce amount, pump outer diameter speed, pump start speed after sauce has been distributed on the outer diameter, pump deceleration after sauce has been distributed on the outer diameter, and pump outer diameter distance.

In one aspect the turntable parameters may include at least one or more of maximum turntable speed, turntable outer diameter speed, turntable acceleration, and turntable outer diameter distance.

In one aspect the arm parameters may include at least one or more of arm start position, arm start speed, arm acceleration, and arm outer diameter distance.

Yet another embodiment of the invention may include a method for electronically distributing pizza sauce over pizza dough, the method including receiving a user selection from a user interface for a pizza size, receiving a user selection from a user interface for a pizza type, calculating arm, pump, and turntable parameters using at least one processor on a control board according to the selected pizza size and pizza type, moving an arm with a sauce dispenser to a start position, moving a pump to a home position, accelerating a turntable to a first rotational speed, moving the pump to distribute sauce from the sauce dispenser at a first dispensing rate over the outer diameter area of a pizza dough which is rotating on the turntable at the first rotational speed and simultaneously moving the sauce dispenser from the outer diameter of the pizza dough to the inner diameter area at an accelerated moving rate, dispensing sauce at a decelerated dispensing rate, and accelerating the turntable from the first rotational speed to a second rotational speed.

In one aspect the pump parameters may include at least one or more of total sauce amount, pump outer diameter speed, pump start speed after sauce has been distributed on the outer diameter, pump deceleration after sauce has been distributed on the outer diameter, and pump outer diameter distance.

In one aspect the turntable parameters may include at least one or more of maximum turntable speed, turntable outer diameter speed, turntable acceleration, and turntable outer diameter distance.

In one aspect the arm parameters may include at least one or more of arm start position, arm start speed, arm acceleration, and arm outer diameter distance.

Yet another embodiment of the invention may include a method for electronically distributing pizza sauce over pizza dough, the method including receiving a user selection from a user interface for a pizza type, accelerating a turntable to a first rotational speed and automatically detecting pizza dough size, retrieving arm, pump, and turntable parameters from memory on a control board according to the selected pizza size and pizza type, moving an arm with a sauce dispenser to a start position, moving a pump to a home position, accelerating a turntable to a first rotational speed, moving the pump to distribute sauce from the sauce dispenser at a first dispensing rate over the outer diameter area of a pizza dough which is rotating on the turntable at the first rotational speed, and simultaneously moving the sauce dispenser from the outer diameter of the pizza dough to the inner diameter area at an accelerated moving rate, dispensing sauce at a decelerated dispensing rate, and accelerating the turntable from the first rotational speed to a second rotational speed.

In one aspect the pump parameters may include at least one or more of total sauce amount, pump outer diameter speed, pump start speed after sauce has been distributed on the outer diameter, pump deceleration after sauce has been distributed on the outer diameter, and pump outer diameter distance.

In one aspect the turntable parameters may include at least one or more of maximum turntable speed, turntable outer diameter speed, turntable acceleration, and turntable outer diameter distance.

In one aspect the arm parameters may include at least one or more of arm start position, arm start speed, arm acceleration, and arm outer diameter distance.

Yet another embodiment of the invention may include a method for electronically distributing pizza sauce over pizza dough, the method including receiving a user selection from a user interface for a pizza type, accelerating a turntable to a first rotational speed and automatically detecting pizza dough size, calculating arm, pump, and turntable parameters using at least one processor on a control board according to the selected pizza size and pizza type, moving an arm with a sauce dispenser to a start position, moving a pump to a home position, accelerating a turntable to a first rotational speed, moving the pump to distribute sauce from the sauce dispenser at a first dispensing rate over the outer diameter area of a pizza dough which is rotating on the turntable at the first rotational speed, and simultaneously moving the sauce dispenser from the outer diameter of the pizza dough to the inner diameter area at an accelerated moving rate, dispensing sauce at a decelerated dispensing rate, and accelerating the turntable from the first rotational speed to a second rotational speed.

In one aspect the pump parameters may include at least one or more of total sauce amount, pump outer diameter speed, pump start speed after sauce has been distributed on the outer diameter, pump deceleration after sauce has been distributed on the outer diameter, and pump outer diameter distance.

In one aspect the turntable parameters may include at least one or more of maximum turntable speed, turntable outer diameter speed, turntable acceleration, and turntable outer diameter distance.

In one aspect the arm parameters may include at least one or more of arm start position, arm start speed, arm acceleration, and arm outer diameter distance.

Yet another embodiment of the invention may include a system for electronically distributing pizza sauce over pizza dough, the system including means for retrieving individual parameters according to a selected pizza size and pizza type, means for accelerating a turntable to a first rotational speed, means for moving an arm including a sauce dispenser to a first position, means for dispensing sauce from the arm including the sauce dispenser at a first dispensing rate over the outer diameter area of a pizza dough which is rotating on the turntable at the first rotational speed, and means for simultaneously moving the arm including the sauce dispenser from the outer diameter area of the pizza dough to the inner diameter area at an accelerated rate, dispensing sauce at a decelerated dispensing rate, and accelerating the turntable from the first rotational speed to a second rotational speed.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DETAILED DESCRIPTION OF THE INVENTION

Figure 1A:
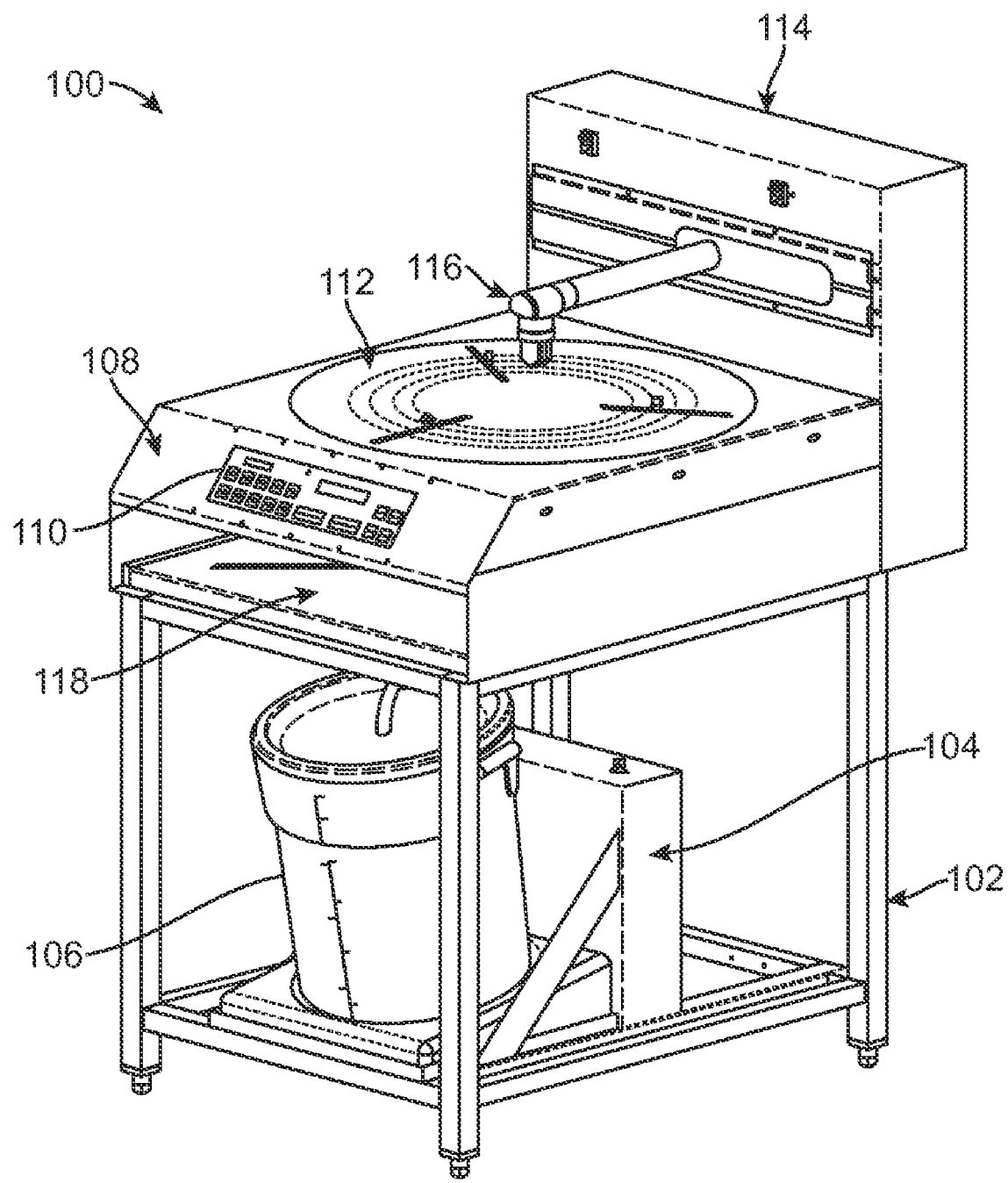
FIG. 1A shows a perspective view of an apparatus, according to one aspect of the invention.

FIG. 1A shows a perspective view of an apparatus 100 for on-demand distribution of a liquid food-product onto dough (e.g. pizza sauce onto pizza crust), according to one aspect of the invention. The apparatus 100 includes a base frame 102 constructed in an open tube-frame fashion. The apparatus 100 can have a depth of 24 inches, which is a standard kitchen counter top depth. The apparatus 100 includes a pump device 104 and a sauce tank 106. The sauce tank 106 supplies liquid food-product to the pump device 104. The sauce tank 106 is arranged at an angle so that a suction hose can be arranged at the lowermost portion of the sauce tank to effectively remove all contents therein.

The apparatus 100 includes a table top section 108. The table top section 108 is generally constructed from sheet metal sections which are welded or bolted together. The table top section 108 also includes a control panel 110 for electronic interaction with the apparatus 100 by a user. Turntable 112 is integrated and rotationally attached to the table top section 108. A round pan holding a dough-based food product (e.g. pizza crust) is intended to sit on top of the turntable 112. The turntable 112 rotates the pan for even distribution of a liquid food-product onto the dough-based food product.

A control box 114 is attached to the rear section of the table top section 108. The control box 114 houses control electronics and a fluid interface for connecting to the pump device 104. The control box 114 also includes a linear arm 116 which distributes liquid food-product out of a nozzle in an even and smooth manner onto the dough-based food product. The linear arm 116 is actuated by a linear actuator housed within the control box. The linear arm 116 is intended to move over and across a radius of the turntable 112 at varying speed, as the outer radius of the turntable will naturally have a higher angular speed than the inner radius at a constant rpm. The linear arm 116 is also fluidly connected to the pump device 104, which supplies liquid food-product to the linear arm 116.

The apparatus 100 also includes a pull out crumb tray 118. The crumb tray 118 catches food particles which pass through the turntable 112 in normal use. The crumb tray 118 is removable for cleaning.

Figure 1B:
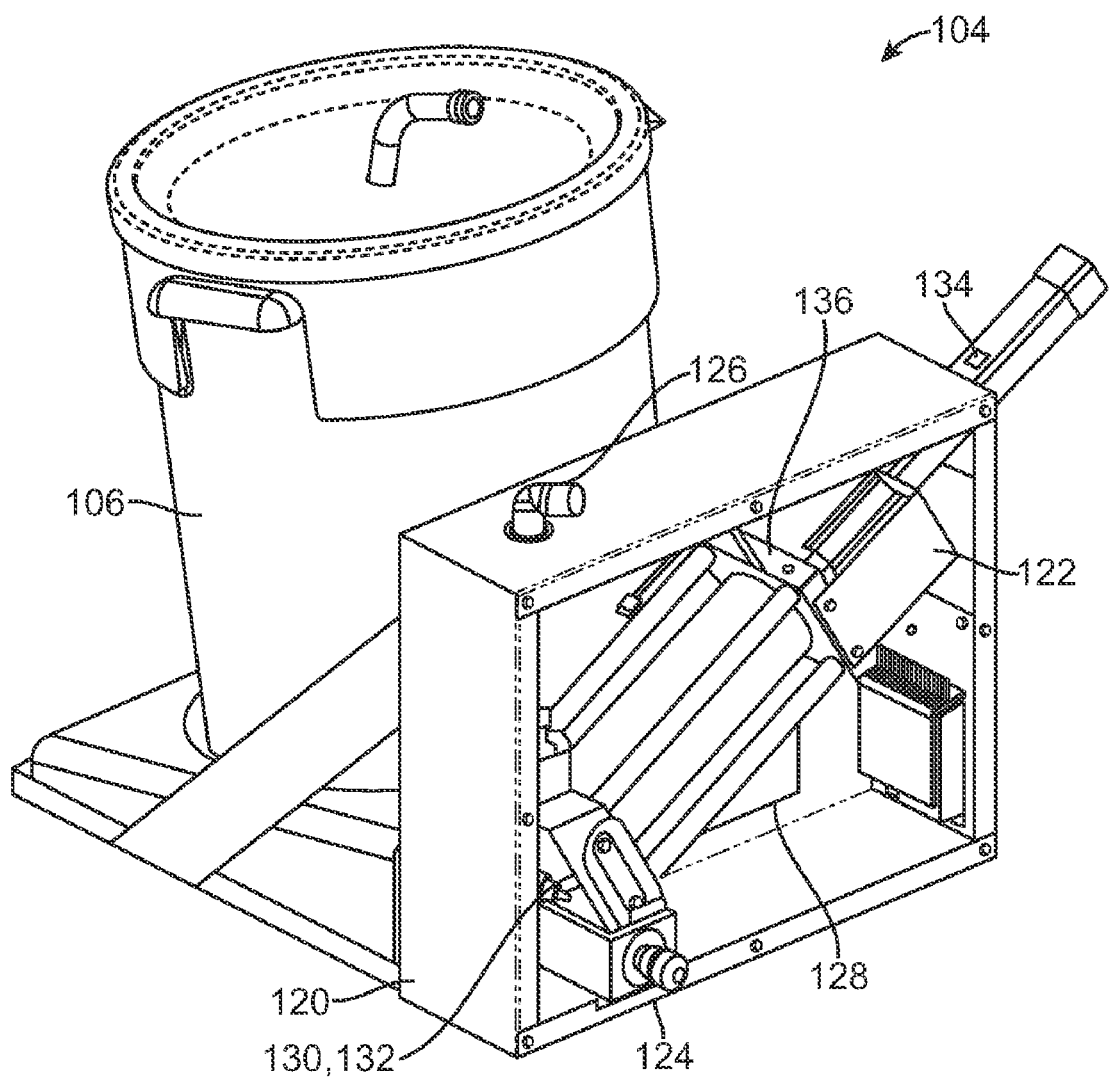
FIG. 1B shows a perspective view of an apparatus, according to one aspect of the invention.

FIG. 1B shows a rear view of the pump device 104. The pump device 104 includes a housing 120, which is constructed from sheet metal. In this view a back portion of the housing 120 has been removed to show the inner workings of the pump device 104. The pump device 104 includes a pump assembly 122. The pump assembly 122 includes an electric stepper motor and lead screw. The lead screw actuates a piston, which draws in (by vacuum) the liquid food-product into a cylinder from inlet 124. The piston also pressurizes the cylinder through a second piston actuation and forces out the liquid food-product through an outlet 126 and to the linear arm 116. The pump device 104 also includes a pump board 128 which houses electronics for controlling the pump and interfacing with the control box 114. The pump board 128 is in turn controlled by the control box 114. An optional vacuum sensor 130 attached to the pump device 104 indicates to a vacuum board 132 and the pump board 128 whether any liquid food-product is remaining in the pump device 104, and thus in the sauce tank 106 as well, which is known as high-vacuum level monitoring. An optional home sensor 134, and limit sensor 136 are included in the pump device 104 for setting an initial pump position and limiting the travel of the pump, respectively.

In use, a user of the apparatus 100 will first fill the sauce tank 106 or check to make sure the sauce tank 106 is full. An indicator light on the table top section 108 will indicate whether the sauce tank 106 is full. The user places a predetermined sized pan (e.g. personal, small, medium, large, extra-large), with a respective sized dough based food-product, onto the turntable 112. The user then interfaces with the control panel 110 to select pan size and desired sauce depth (e.g. dough type). Hidden grippers emerge from slots within the turntable 112 to grip the pan. The turntable 112 rotates and liquid food-product emerges from the linear arm in an even and consistent manner. The linear arm moves along a radius of the turntable 112, at a varying rate to ensure that the liquid food-product is evenly spread over the surface of the dough based food-product. The linear arm stops dispensing after the liquid food-product has been distributed to a desired consistency. The grippers then releases the pan and the user may retrieve the processed dough based food-product. Examples of gripping mechanisms are also shown in co-assigned patents: U.S. Pat. No. 6,892,629, U.S. Pat. No. 6,892,901, and U.S. Pat. No. 7,074,277, the entirety of which are herein incorporated by reference.

Figure 2A:
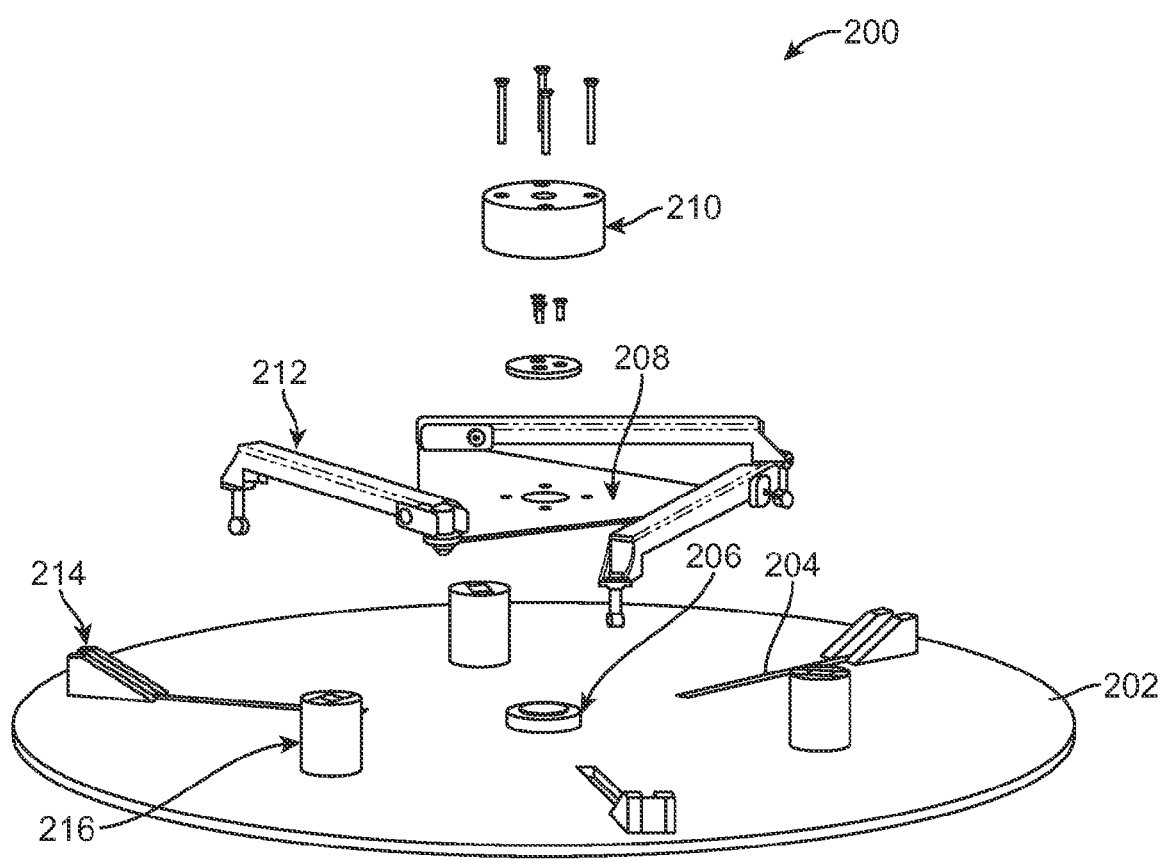
FIG. 2A shows a perspective exploded view of an apparatus, according to one aspect of the invention.

FIG. 2A shows an exploded view of the bottom of a turntable 200, which is also shown in FIG. 1A. The bottom of the turntable 200 includes three slots 204. The slots 204 pass completely through the turntable, and are circumferentially distributed around the turntable 200. The slots are preferably 120 degrees apart. At the center of the turntable 200 is a center boss mount 206, which may be a bearing. A drive hub plate 208 rotationally connects to the center boss mount 206. The drive hub plate 208 is a flat triangulated plate, and is driven by a motor 210, which may be a DC or stepper motor. The drive hub plate 208 includes three mounting holes (not shown). The mounting holes are arranged in a bolt circle about the center boss mount 206, preferably 120 degrees apart.

Gripper linkages 212 are rotationally coupled to the mounting holes. Each gripper linkage 212 includes a portion which extends through a respective slot 204. Gripper stops 214 route the gripper linkages 212 up the ramp shaped gripper stops 214 to cause no portion of the gripper linkages to appear on the top surface of the turntable 200. The turntable 200 also includes sensor target boss 216 mounted to the bottom surface. The sensor target boss 216 relay signals for determination of pan size. Examples of sensor mechanisms are also shown in co-assigned patents: U.S. Pat. No. 6,892,629, U.S. Pat. No. 6,892,901, and U.S. Pat. No. 7,074,277, the entireties of which were herein incorporated by reference above.

Figure 2B:
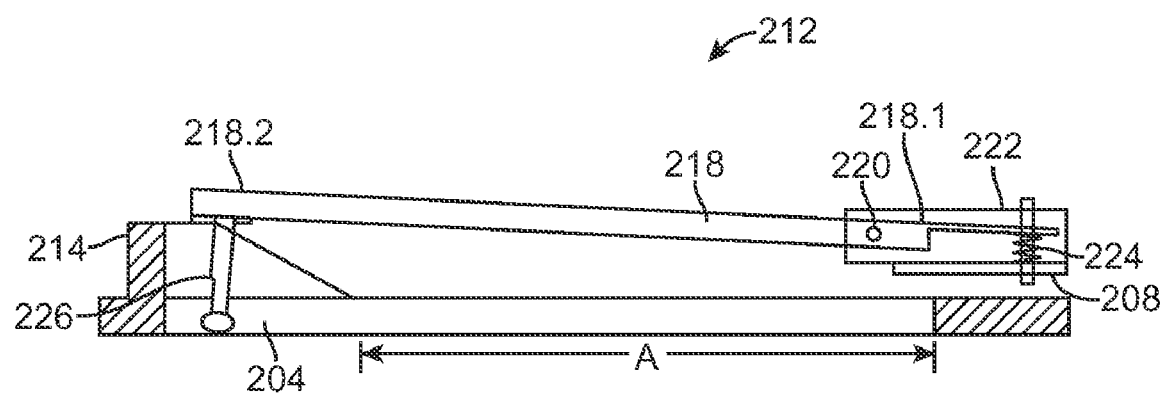
FIG. 2B shows a cross-sectional view of an apparatus, according to one aspect of the invention.

FIG. 2B shows a cross section of one gripper linkage 212. The gripper linkage 212 includes a main arm 218. The main arm 218 can be an elongated section of boxed sheet metal. The main arm 218 includes a near end 218.1, located towards the inner radius of the turntable 200, and a far end 218.2 located towards the outer radius. A linkage mount 220 hingedly connects the main arm 218 to a sub-arm 222. The linkage mount 220 has an axis which is parallel to the bottom surface of the turntable 200, allowing the main arm to hinge at various angles.

The sub-arm 222 can be constructed similarly to the main arm 218, and is also elongated, although shorter than the main arm 218. The sub-arm 222 is also rotationally connected to drive hub plate 208 at mount 224. Mount 224 is perpendicular to the turntable 200, and allows the entire gripper linkage 212 to rotate about the mount. The mount 224 also includes a spring member which places an expansive force on the main arm 218 at the near end, which is transferred to the far end.

The far end of the main arm 218 includes a gripper 226. The gripper 226 is an elongated member connected to the main arm 218. The gripper 226 has a diameter which is less than the width of the slot 204, and the gripper 226 is also constrained and slides within slot 204.

At the outer end of slot 204 a gripper stop 214 is attached to the turntable 200, and aligned with slot 204. The gripper stop 214 features a slot which is substantially the same width and also aligned with slot 204. The gripper stop 214 is also ramp shaped, with an incline beginning nearer the center of the turntable 200. The gripper 226 is also constrained and slides within the gripper stop 214, and may be concealed within gripper stop 214. When the far end of the main arm 218 is positioned towards the outer radius of the turntable 200, the far end will ride up the gripper stop 214 and conceal the gripper stop 214 below the surface of the turntable 200.

In use, at least grippers 226 position on the top side of the turntable 200 to couple to and center a pan. The grippers 226 will initially be positioned towards the outer radius of the turntable 200. At the initial position the grippers are concealed within the gripper stop 214, and therefore are not protruding above the top surface of the turntable 200. Concealing the grippers is very advantageous. It has been found that grippers which are continuously exposed often will be damaged in the course of normal use, as in a kitchen environment workers will not always practice the utmost care in the handling of equipment. Thus an apparatus utilizing concealed grippers may withstand more abuse than one without.

The grippers 226 will slide past the gripper stop 214 and become fully exposed in zone A of slot 204. The grippers 226 are positioned by the gripper linkages 212 which in turn are positioned by the rotating drive hub plate 208. The grippers 226 will continue to travel towards the center of the turntable 200 until each meet resistance from the pan. The pan does not need to be placed concentrically with the turntable 200, because the grips will center the pan automatically. The grippers 226 will return to the initial position after the apparatus distributes a liquid food product.

Figure 3A:
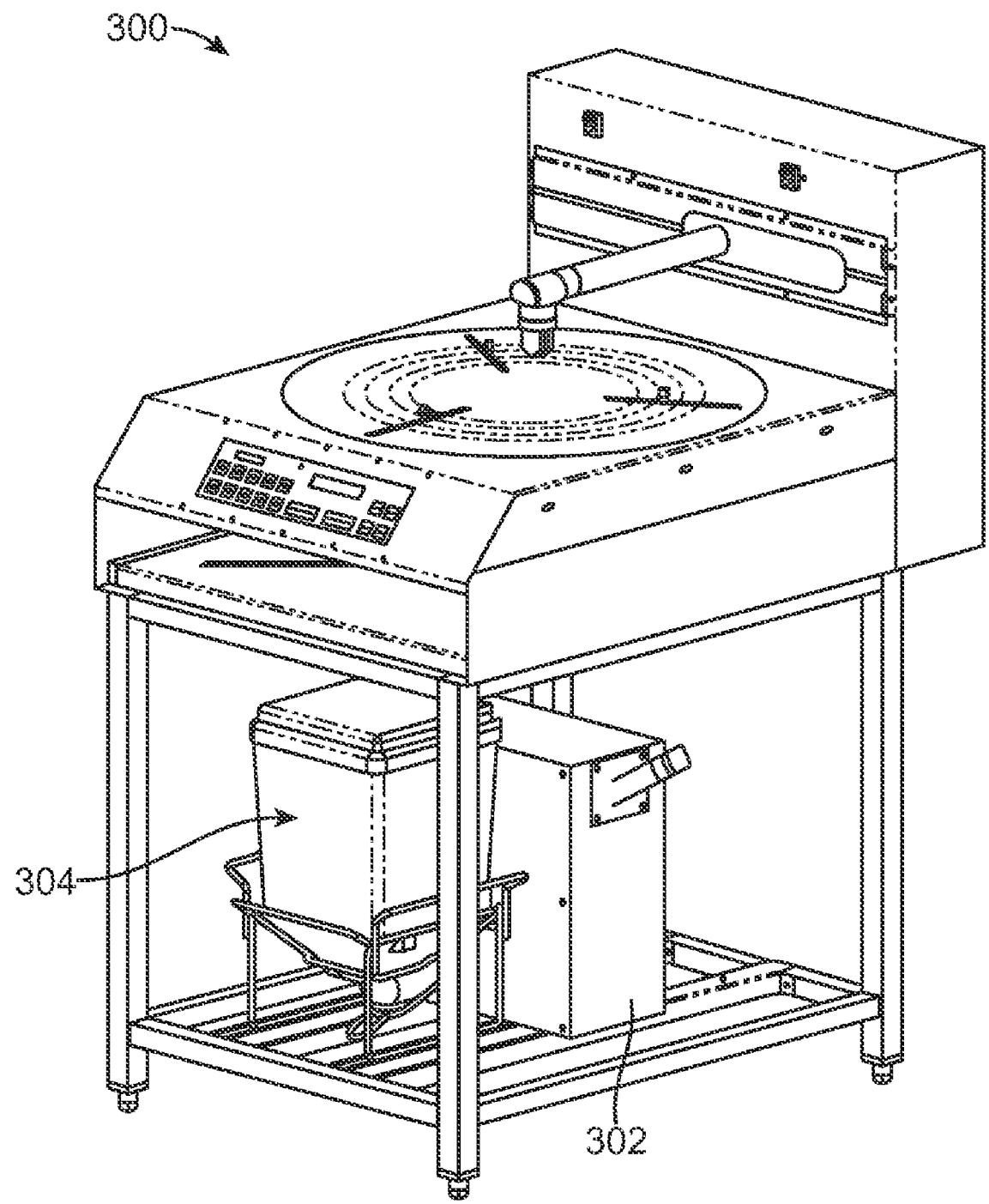
FIG. 3A shows a perspective view of an apparatus, according to one aspect of the invention.

FIG. 3A shows an alternative construction of an apparatus 300 for on-demand distribution of a liquid food-product onto dough, according to one aspect of the invention. The construction of apparatus 300 is largely identical to the construction of apparatus 100, with the exception of pump device 302 and sauce vat 304. The pump device 302 is unique in that it dilutes concentrated liquid food-product stored in sauce vat 304. Apparatus 300 includes several advantages. By using a concentrated liquid food-product, the apparatus 300 needs to be refilled less often. Additionally, the apparatus may adjust the mixing ratio of the dispensed sauce. For example some pizzas require a thicker sauce while others require a thinner sauce. By using a concentrated liquid food-product, thickness changes may occur on-demand. Previous apparatuses required changing of the entire sauce supply in order to implement a different sauce thickness.

Figure 3B:
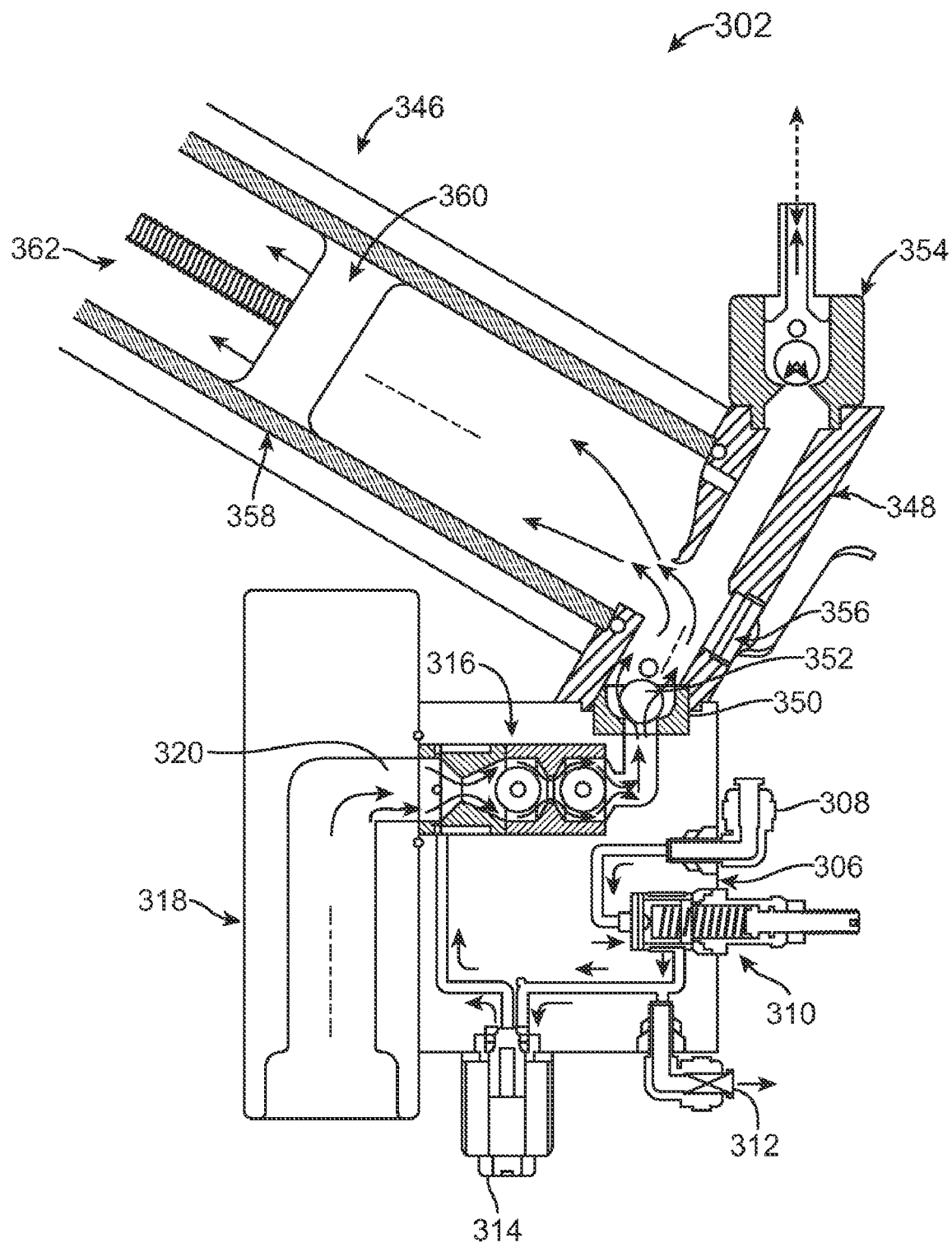
FIGS. 3B and 3B show a cross-sectional view of an apparatus, according to one aspect of the invention.

FIG. 3B shows a flow diagram of the pump device 302. The pump device 302 includes mixing device 306. The mixing device 306 is responsible for diluting concentrated liquid food product stored in sauce vat 304. A diluting liquid (e.g. water, oil) enters the mixing device 306 at inlet 308. Inlet 308 is typically a high-pressure threaded or quick-release fitting. The diluting liquid is then routed to a spring balanced flow regulator 310. The flow regulator 310 is adjustable to increase the pressure of the diluting liquid following the flow regulator. The flow regulator 310 may be adjusted to determine the ultimate mixing ratio of liquid food product to diluted liquid, for example it may be 2:1. From the flow regulator 310 the diluting liquid may optionally flow out of flow test port 312. The flow test port 312 is normally closed, but may be opened to measure fluid pressure. Diluting liquid flows past the test port 312 to solenoid valve 314. The solenoid valve 314 is electronically controlled to open and close.

Diluting fluid flows out of the solenoid valve 314 to a venturi-mixing device 316. An inlet block 318 is also attached to the mixing device 306. Concentrated liquid food product is drawn into the mixing device 306 at outlet 320.

FIG. 3B shows a detailed view of the venturi-mixing device 316. The concentrated liquid food product and diluting fluid meet at a first chamber 322, which is generally cylinder shaped. The first chamber reduces into a first venturi device 324.

The first venturi device 324 includes a reduction section 326 and expansion section 328. In the reduction section 326 the mixture of concentrated liquid food product and diluting fluid are first mixed into a mixed fluid. The reduction section 326 serves to increase velocity of the mixed fluid and also force the mixed fluid into a smaller area to create a more homogenous mixture. The expansion section 328 slows down the velocity of the mixed fluid into a first mixing chamber 330. The reduction section 326 preferably has a greater angle of entry than the angle of exit of expansion section 328.

The first mixing chamber 330 is a cylindrical section which includes a static mixing element 332. The static mixing element 332 is a non-moving and captured in the center of the first mixing chamber 330. Here, the static mixing element 332 is a sphere which forces the mixed fluid to the outer portions of the first mixing chamber 330 and helps to create a more homogenous mixture. The mixed fluid is then forced into a second venturi device 334.

The second venturi section 334 includes a reduction section 336 and expansion section 338, similar to the first venturi section. The reduction section 336 preferably has an angle of entry equivalent to the angle of exit of expansion section 338. The expansion section 338 leads into a second mixing chamber 340. The second mixing chamber 340 includes a static mixing element 342, similar to the first mixing chamber 330. The mixed fluid leads into a third venturi device 344 and exits as a completely homogeneous mixture.

Now with attention back to FIG. 3B, a pump 346 is connected to the outlet of the mixing device 306. The pump 346 creates a vacuum and draws in mixed fluid for temporary storage. The pump 346 does not push mixed fluid out immediately after drawing mixed fluid in, thus the pump acts as a storage chamber with a variable internal volume. The pump pushes mixed fluid out to the upper portion of the apparatus 300 for dispensing only when needed, and thus operates on-demand.

The pump 346 includes a pump head 348 which mates to the mixing device 306. A one-way valve 350 is in fluid communication between the pump head 348 and mixing device 306. The one-way valve 350 regulates fluid flow into the pump head 348 and prevents back-flow into the mixing device 306. The one-way valve 350 includes a floating sphere 352 which blocks the pump inlet upon reduction of internal volume of the pump 346, and allows flow upon expansion of the internal volume of the pump 346. In similar fashion a second one-way valve 354 regulates the expulsion of mixed fluid from the pump 346. The second one-way valve 354 allows mixed fluid to exit when the volume of the pump 346 is reduced, and prevents back-flow into the pump head 348 when the volume of the pump 346 is increased. The second one-way valve 354 is similarly constructed to one-way valve 350.

A vacuum sensor 356 is attached to the pump head 348. The vacuum sensor 356 senses the amount of vacuum in the pump 346, which is used to infer the amount of concentrated liquid food product remaining in the sauce vat 304, which is also known as hi-vacuum monitoring. When the sauce vat 304 is empty, the amount of vacuum in the pump may be more than when the sauce vat 304 is full, as the pump may be pulling from an empty sauce vat 304 which may be sealed or partially sealed. Accordingly a signal is provided to the control section of the apparatus which indicates to a user to refill the sauce vat 304. The vacuum sensor 356 also prevents the water solenoid valve 314 from turning on while the vacuum level is above a predetermined low-vacuum level, which is known as low-vacuum monitoring. Accordingly, water will not unintentionally enter the pump when concentrated sauce is not present, unless a cleaning cycle is activated. If the vacuum level did not reach a low-vacuum level within a predetermined amount of time, a warning signal may indicate that an air leak is present in the pump 346.

The pump 346 includes a pump cylinder 358. The pump cylinder 358 is preferentially constructed from a glass cylinder and set to a 30 degree angle, with respect to a horizontal axis. The glass cylinder is preferably constructed from borosilicate glass 3.3, commercially available as SIMAX® glass, which has high temperature and chemical resistance. Alternatively, the pump cylinder 358 may be constructed from a acrylic plastic, fiber glass, composite, or metal cylinder. A movable piston 360 is slidably disposed within the pump cylinder 358. The angle of the pump cylinder 358 is preferential because wear of the pump 346 will eventually cause sediment to form inside the cylinder. The 30 degree angle promotes sediment drainage to the bottom of the pump head 348. Alternatively the pump cylinder may be at a horizontal position. The movable piston 360 is driven by a piston shaft 362 which in turn is driven by an electric step motor (not shown). Movement of the movable piston 360 determines the storage volume of the pump 346.

In use the movable piston 360 starts at a bottom position near the pump head and is drawn into the pump cylinder 358. The movement of the movable piston 360 causes a vacuum to form within the pump cylinder 358. The vacuum closes the second one-way valve 354 and opens one-way valve 350. The solenoid valve 314 is triggered open and supplies diluting fluid to the venturi-mixing device 316. Simultaneously the vacuum draws concentrated liquid food product into the mixing device 316 to mix with the diluting fluid to form a mixed fluid. The mixed fluid fills the pump 346 until the movable piston 360 stops. When the movable piston 360 stops a signal is sent to the solenoid valve 314 to close. A user then requests that mixed fluid is dispensed from the apparatus 300. The movable piston 360 moves in the direction of the pump head 348 to create a positive pressure within the pump 346. The positive pressure causes the one-way valve 350 to close and the second one-way valve 354 to open. Mixed fluid is then dispensed out of the second-one way valve 354 to the remaining portions of the apparatus 300 for dispensing.

Figure 3C:
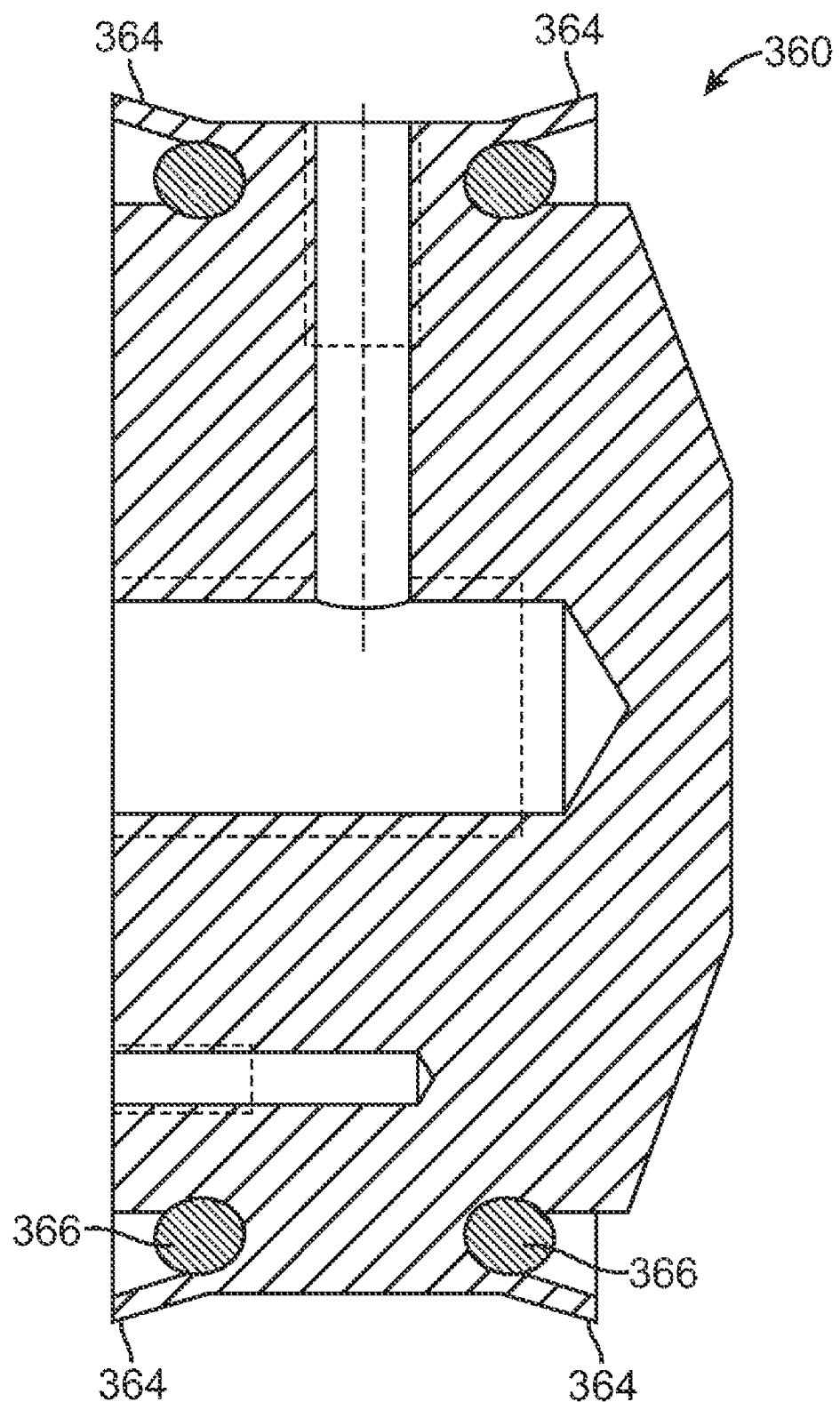
FIG. 3C shows a cross-sectional view of an apparatus, according to one aspect of the invention.

FIG. 3C shows the movable piston 360. The movable piston 360 is preferably constructed from a self-lubricating polymer, such as UHMW-PE or PTFE. The movable piston 360 preferably includes at least two sealing surfaces 364 to prevent leakage of fluids. The sealing surfaces 364 are compressed when placed within the pump cylinder 358 to provide constant force against the pump cylinder walls. Seal expanders 366, in the form of o-rings, ensure that the sealing surfaces 364 maintain force against the pump cylinder walls throughout the life of the movable piston 360.

Figure 3D:
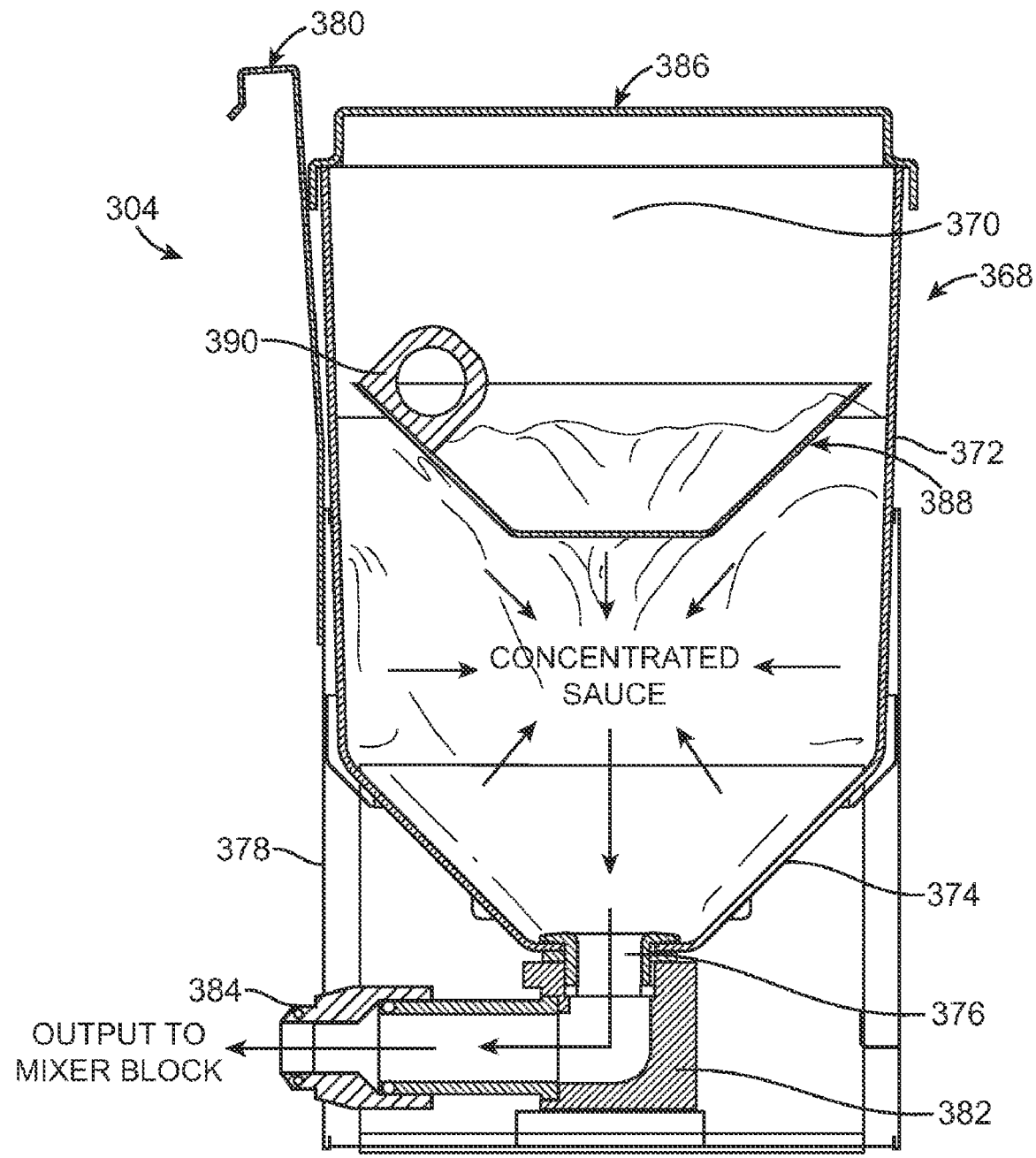
FIG. 3D shows a cross-sectional view of an apparatus, according to one aspect of the invention.

FIG. 3D shows a cross-section of sauce vat 304, according to one aspect of the invention. The sauce vat 304 includes a reusable vat 368. The reusable vat 368 includes a loadable top section 370, a substantially uniform mid-section 372, and a reducing bottom section 374. The reducing bottom section 374 reduces into an outlet 376. A frame 378 supports the bottom section 374 and the mid-section 372. The frame 378 is used since the reusable vat 368 is not self supporting. The frame 378 includes a hanging device 380. The hanging device 380 is able to support the weight of the sauce vat 304 and couple to the pump device 302. The outlet 376 attaches to an output tube 382. The output tube 382 is a 90 degree tube with an exit that extends past the frame 378 and attaches to the pump device 302. The output tube 382 includes a strainer 384 that prevents solids from entering the pump device 302. A vat cover 386 attaches to the top section 370 and prevents dirt from entering the reusable vat 364.

A float 388 is placed over the concentrated food product inside the reusable vat 368. The concentrated food product has the tendency to adhere to the interior of the reusable vat 368. The concentrated food product is generally very thick and viscous, and will clump unless removed by external force. Thus the weight of the concentrated food product is insufficient to overcome its tendency to clump and will not completely self-expel from the reusable vat 368. The float 388 is pyramid shaped and generally matches the interior of the bottom section 374. The edges of the float 388 are dimensions so that they scrape off concentrated food product adhered to the interior of the mid-section 372 as the level of concentrated food product diminishes in the reusable vat 368. The float 388 is also of sufficient mass that it helps force concentrated food product out of the outlet 376. The float 388 includes hooking point 390 to aid in removal of the float 388 when all the concentrated food product has been removed.

Figure 4A:
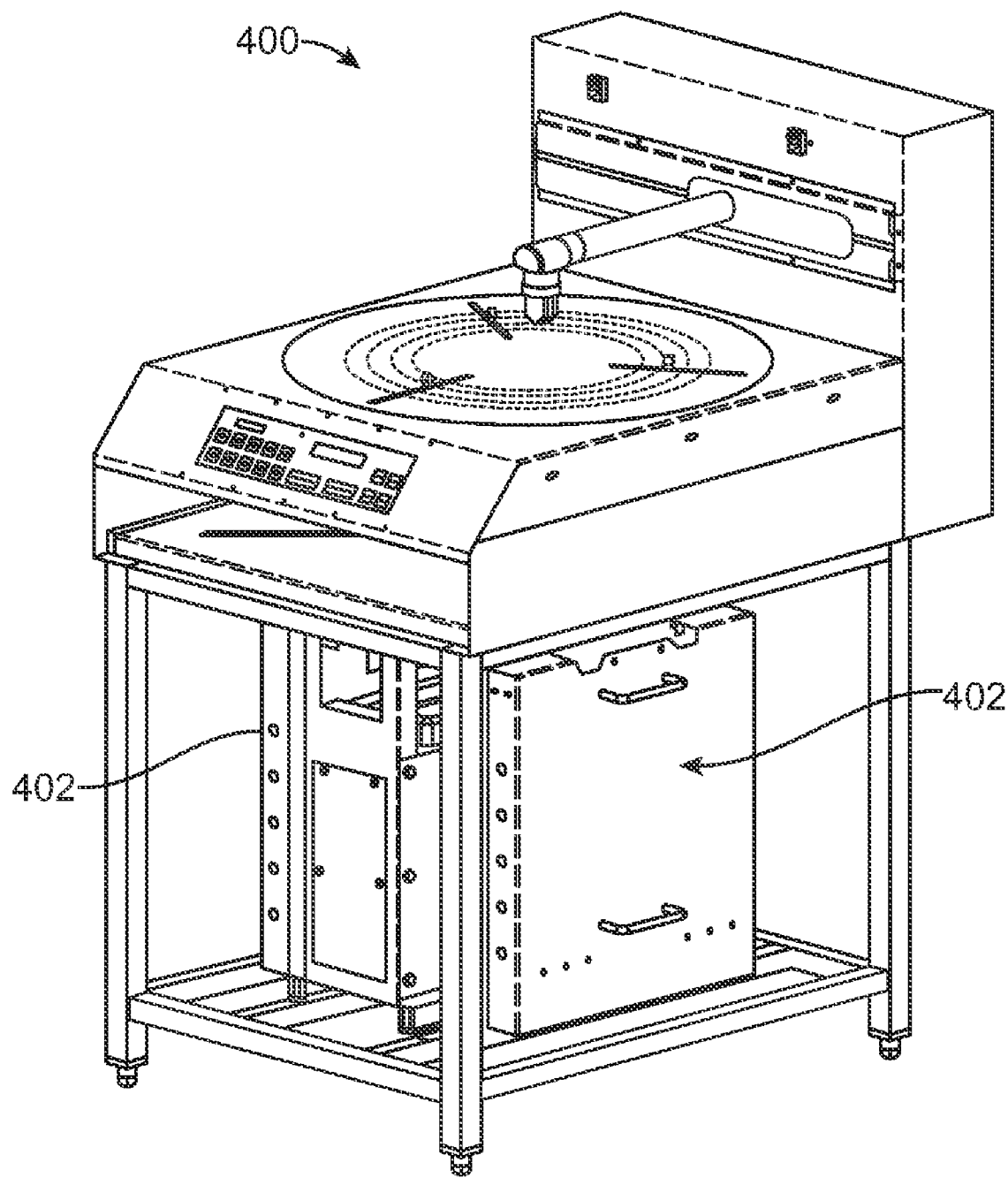
FIG. 4A shows a perspective view of an apparatus, according to one aspect of the invention.

FIG. 4A shows an alternative construction of an apparatus 400 for on-demand distribution of a liquid food-product onto dough, according to one aspect of the invention. The construction of apparatus 400 is largely identical to the construction of apparatus 300, with the exception of the cassette device 402. The cassette device 402 supplies concentrated liquid food product in a unique form. The cassette device 402 is advantageous because it requires minimal cleaning and can use pre-packaged concentrated liquid food product as shipped from a factory. Other devices require concentrated liquid food product to be poured into a container before use. More than one, for example 2 or more, cassettes 402 may be used on one apparatus 400.

Figure 4B:
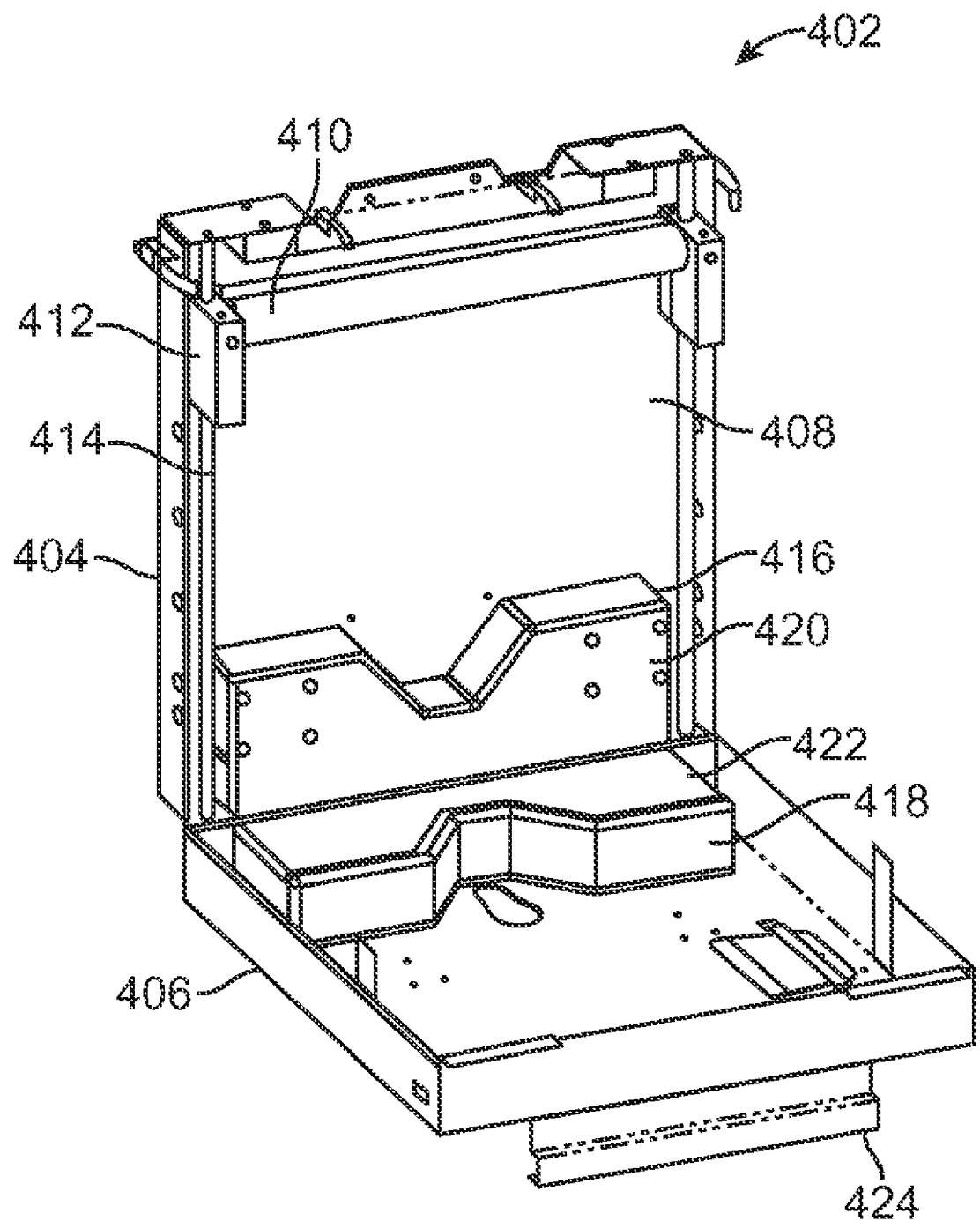
FIGS. 4B-4E show a perspective views of an apparatus, according to one aspect of the invention.

FIG. 4B shows the cassette 402 in an open position. The cassette is structured like a suit case, with a first half 404 connected by a hinge to a second half 406. The first half includes a dispensing device 408. The dispensing device 408 includes two parallel rollers 410. The parallel rollers 410 are connected to slider blocks 412 which are slidably attached to respective guide shafts 414. The dispensing device 408 is configured to allow the two parallel rollers 410 to freely slide down the guide shafts 414. The parallel rollers 410 are of significant weight, and preferably weigh 6-8 lbs. each.

The cassette 402 also includes a compression device 416 and 418. The compression device has spring loaded surfaces 420 and 422 which extend beyond the edges of the first half 404 and second half 406 of the cassette 402. When the cassette 402 is closed the spring loaded surfaces 420 and 422 will contact and deflect to compress and hold whatever item may be positioned between them.

The cassette 402 also includes a hanging device 424 shown attached to the second half 406 of the cassette 402. The hanging device 424 attaches to the pump device and supports the weight of the cassette 402.

Figure 4E:
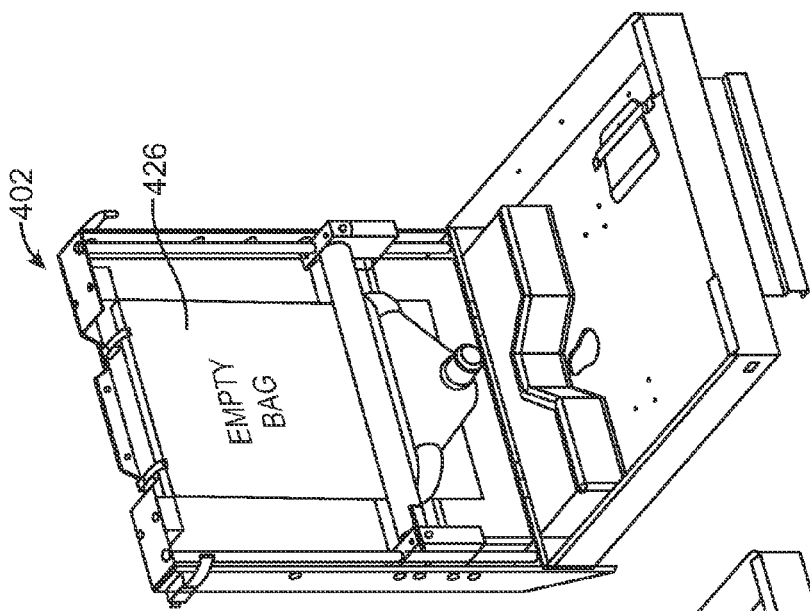
Figure 4D:
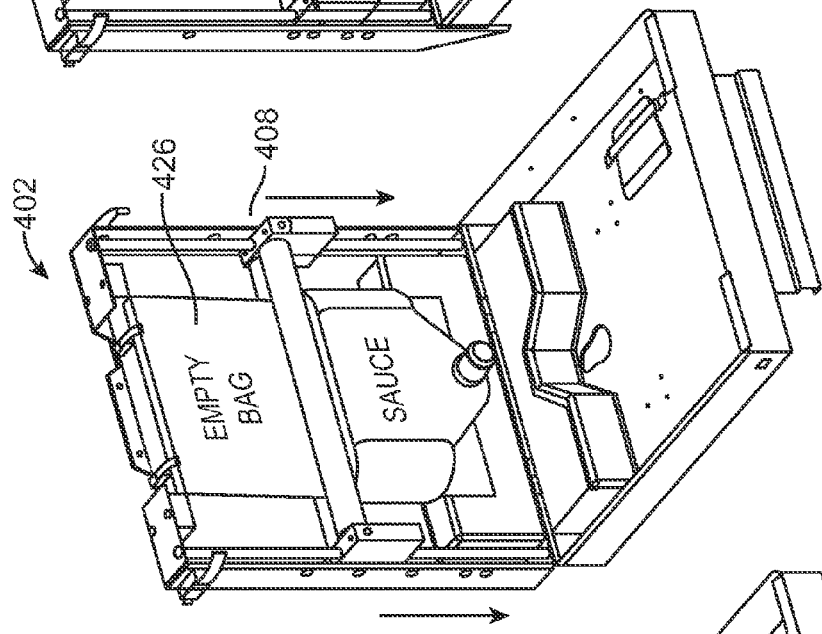
Figure 4C:
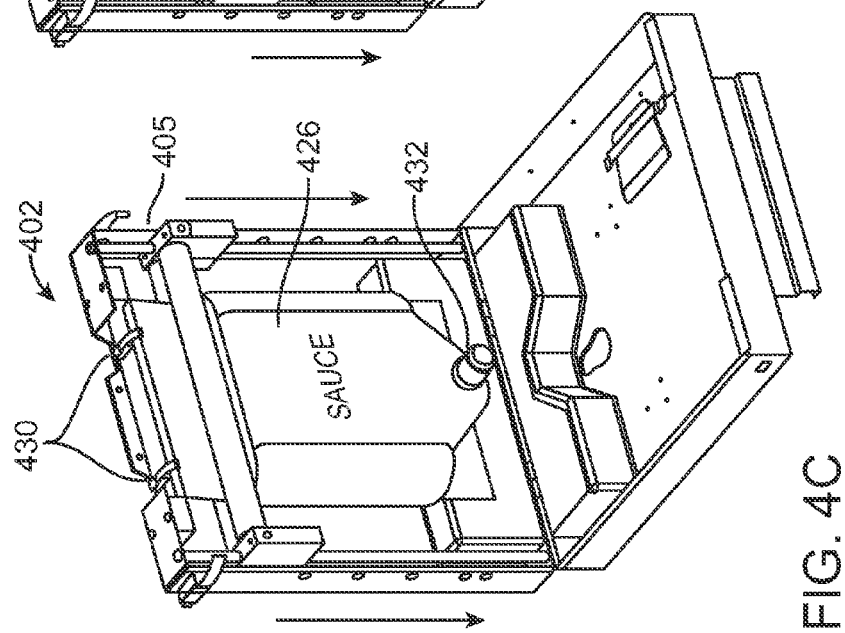

FIGS. 4C-4E show the cassette 402 in use. The figures show the cassette 402 in an open position for illustrative reasons only, normally the cassette is used in a closed position. FIG. 4C shows a sauce bag 426 attached to the cassette 402. The sauce bag 426 is preferably constructed from a pliable material, such as plastic. The sauce bag 426 is attached to clips 430 at the uppermost portion of the sauce bag 426 and cassette 402. The sauce bag 426 is also placed (e.g. sandwiched) between the rollers 410 of the dispensing device 408. The sauce bag 426 includes an outlet 432 which attaches to the pump device. The sauce bag 426 contains a concentrated food product that has the tendency to adhere to the interior of the sauce bag 426. The concentrated food product is generally very thick and viscous, and will clump unless removed by external force. Thus the weight of the concentrated food product is insufficient to overcome its tendency to clump and will not completely self-expel from the sauce bag 426.

FIG. 4D shows that the dispensing device 408 has traveled approximately half-way down the sauce bag 426. The dispensing device 408 pinches the sauce bag but not to a degree where the dispensing device 408 is not able to freely travel. The weight of the dispensing device 408 serves to dispense the concentrated food product contained within the sauce bag 426. As shown the empty portion of the sauce bag 426 is flattened and devoid of concentrated food product. FIG. 4E shows that the dispensing device 408 has traveled completely down the sauce bag 426. The sauce bag 426 is completely empty and may easily be replaced with a new prepackaged sauce bag 426.

Figure 5:
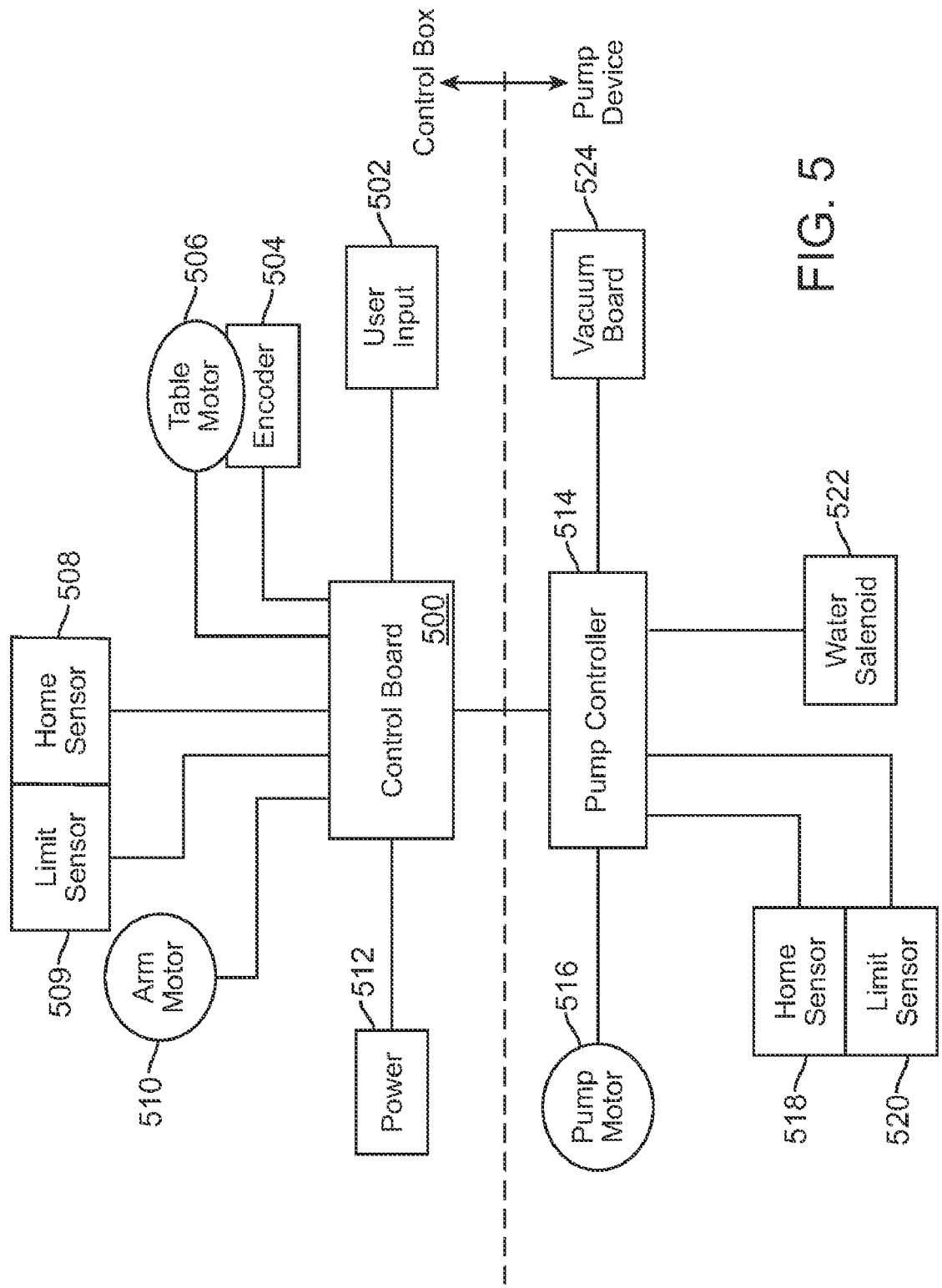
FIG. 5 shows a block diagram of a system, according to one aspect of the invention.

FIG. 5 shows a block diagram for a system for on-demand distribution of a liquid food-product, which may be implemented in for example apparatus 100, apparatus 300, or apparatus 400 described herein, according to one aspect of the invention. References to elements in description of FIG. 5 should be generically applied to the above apparatuses. The control board 500 is for example housed within the control box. The control board 500 controls at least in part, all aspects of the apparatus. The control board 500 may be a programmable logic controller (PLC) based system or an embedded computer system. The control board 500 generally includes at least one processor for executing instructions, a communications bus, and memory for storing instructions. Factory preset and user defined runtime parameters related to apparatus performance may also be stored in memory. The instructions are generally the methods disclosed herein. User input 502 (e.g. key pad) is electrically connected to the control board. The user input 502 relates requests and commands from a user interface to the control board 500. Turntable motor 506 is also powered and controlled by the control board 500. The turntable motor 506 actuates both the rotation of the turntable and of the gripper mechanism. The home sensor 508 sends a signal to the control board to indicate that the linear arm is at a designated home position. The optional limit sensor 509 sends a signal to the control board to indicate that the linear arm is at a designated position to restrict the linear arm movement in and out of from the center of the turntable, which in turn improves timing performance. The arm motor 510 is also controlled by the control board. Power 512 is supplied to the control board for distribution to the various aspects of the system.

The control board 500 also interfaces and commands the pump controller 514. The pump controller 514 may be a programmable logic controller (PLC) based system or an embedded computer system. The pump controller 514 is located on the pump device. The pump controller 514 controls the pump device. The pump motor 516 is operated by the pump controller 514, which may be a stepper motor. An optional home sensor 518 and a limit sensor 520 send signals to the pump controller 514 about the location of the piston inside the cylinder. The optional home sensor 518 is used to help limit air packet accumulations inside the pump. The pump controller 514 uses the signal positions to prevent damage to the pump device. The water solenoid 522 is also controlled by the pump controller 514. The pump controller 514 opens the water solenoid 522 when the pump motor 516 is drawing in food concentrate. The pump controller 514 closes the solenoid when the pump motor is non-operational or is expelling food concentrate. The vacuum board 524 is also connected to the pump controller. The vacuum board 524 senses when the pump device has run out of food concentrate, and the pump controller will indicate to the control board 500 that the pump device is empty. The control board 500 would then alert the user and close the water solenoid 522.

Figure 6A:
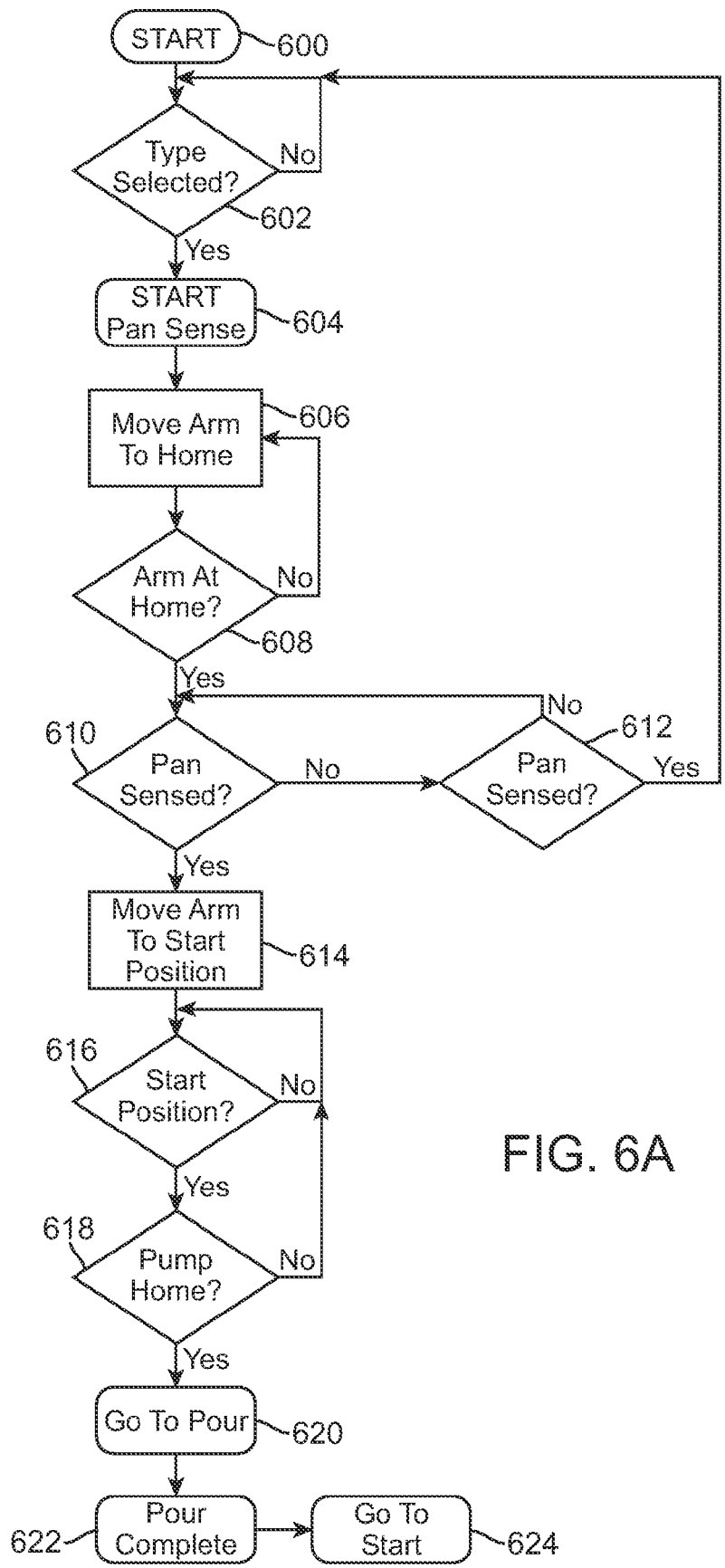
FIG. 6A shows a flow diagram of a method, according to one aspect of the invention.

FIG. 6A shows a flow chart for a method for on-demand distribution of a liquid food-product, which may be implemented in apparatuses described herein, according to one aspect of the invention. At operation 600 a user begins the method. At operation 602 the user selects the type of food product (e.g. pizza) desired. For example, the selection may include pizza size (e.g. small, medium, large, extra-large) and desired sauce type and thickness. At operation 604, pan-size sensors are initiated to detect the size of the pan placed on the apparatus. At operations 606 and 608 the linear arm is positioned (if necessary) and verified to be at a home position. At operations 610 and 612 the pan-size sense operation is completed and verified, or will reinitiate if a pan is not sensed. At operation 614 and 616 the linear arm is moved to a start position and verified. At operation 618 the pump is moved (if necessary) to a home position and verified. At operation 620 sauce is distributed onto the pan. At operation 622 the pour operation is completed and the method reinitiates to the beginning of the method for initiation of a new cycle.

Figure 6B:
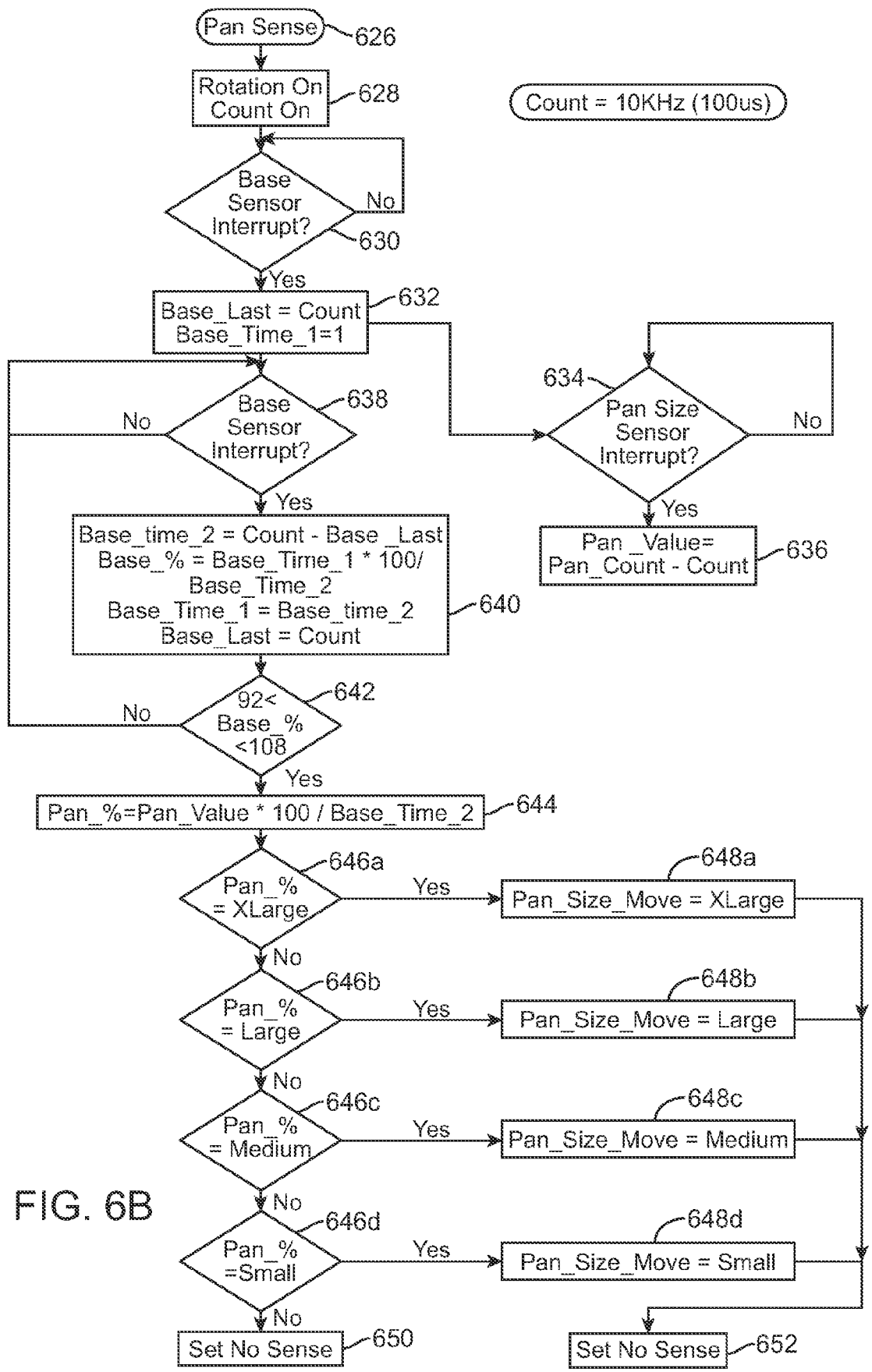
FIG. 6B shows a flow diagram of a method, according to one aspect of the invention.

FIG. 6B shows the detail of a method regarding operation 606 of FIG. 6A, according to one aspect of the invention. At operation 626 the method begins from the initiation of the pan-sense operation. The pan-sense operation uses two sensors, a base sensor and a pan size sensor. The sensors measure different frequencies and the relationship between them determines the pan size. The inner diameter of the turntable has a lower frequency than the outer diameter(s), and thus the frequency difference is used to calculate pan size. The sensors may be optical, magnetic, hall-effect, mechanically triggered, or of various other types known in the art. When the base sensor is triggered sequentially in the same location, then the pan value is considered valid. At operation 628 the rotation of the turntable is begins. At operation 630 it is verified whether the base sensor has been interrupted.

At operation 632 the base sensor has been interrupted and values Base_Last and Base_Time_1 are initialized. Base_Last=Count and Base_Time_1=1. Count for example may be 10 KHz (100 μs).

At operation 634 it is determined if the pan-size sensor has been interrupted. At 636 the pan-size sensor has been interrupted and value Pan_Value is initialized. Pan_Value=Pan_Count−Count.

At operation 638 it is determined whether the base sensor has been interrupted for a second time. At operation 640 values are recorded and calculated which will determine if the pan values are valid.

Base_Time_2=Count−Base_Last

Base_%=Base_Time_1(100/Base_Time_2)

Base_Time_1=Base_Time_2

Base_Last=Count

At operation 642 it is determined whether the first and second base sensor measurements are similar, e.g., whether Base_Time_1 is close to the value of Base_Time_2. For example whether the values are within 16% of each other.

At operation 644 the base sensor measurements are confirmed to be similar and the Pan_% value is calculated. Pan_%=Pan_Value (100/Base_Time_2)

At operation 646*a* the Pan_% is determined to equal a extra large size. This may occur from comparing the calculated Pan_% with a value on a table. At operation 648*a*, a Pan_Size_Move value is initialized to equal an extra large size, which may be used for determining proper positioning of the linear arm.

At operation 646*b* the Pan_% is determined to equal a large size. This may occur from comparing the calculated Pan_% with a value on a table. At operation 648*b*, a Pan_Size_Move value is initialized to equal a large size, which may be used for determining proper positioning of the linear arm.

At operation 646*c* the Pan_% is determined to equal a medium size. This may occur from comparing the calculated Pan_% with a value on a table. At operation 648*c* a Pan_Size_Move value is initialized to equal a medium size, which may be used for determining proper positioning of the linear arm.

At operation 646*d* the Pan_% is determined to equal a small size. This may occur from comparing the calculated Pan_% with a value on a table. At operation 648*d*, a Pan_Size_Move value is initialized to equal a small size, which may be used for determining proper positioning of the linear arm.

At operation 650 the Pan_% is determined to not equal any known sizes and the pan size has not been set. At operation 652 the Pan_% is determined to equal a known size and the pan has been properly sensed.

Figure 6C:
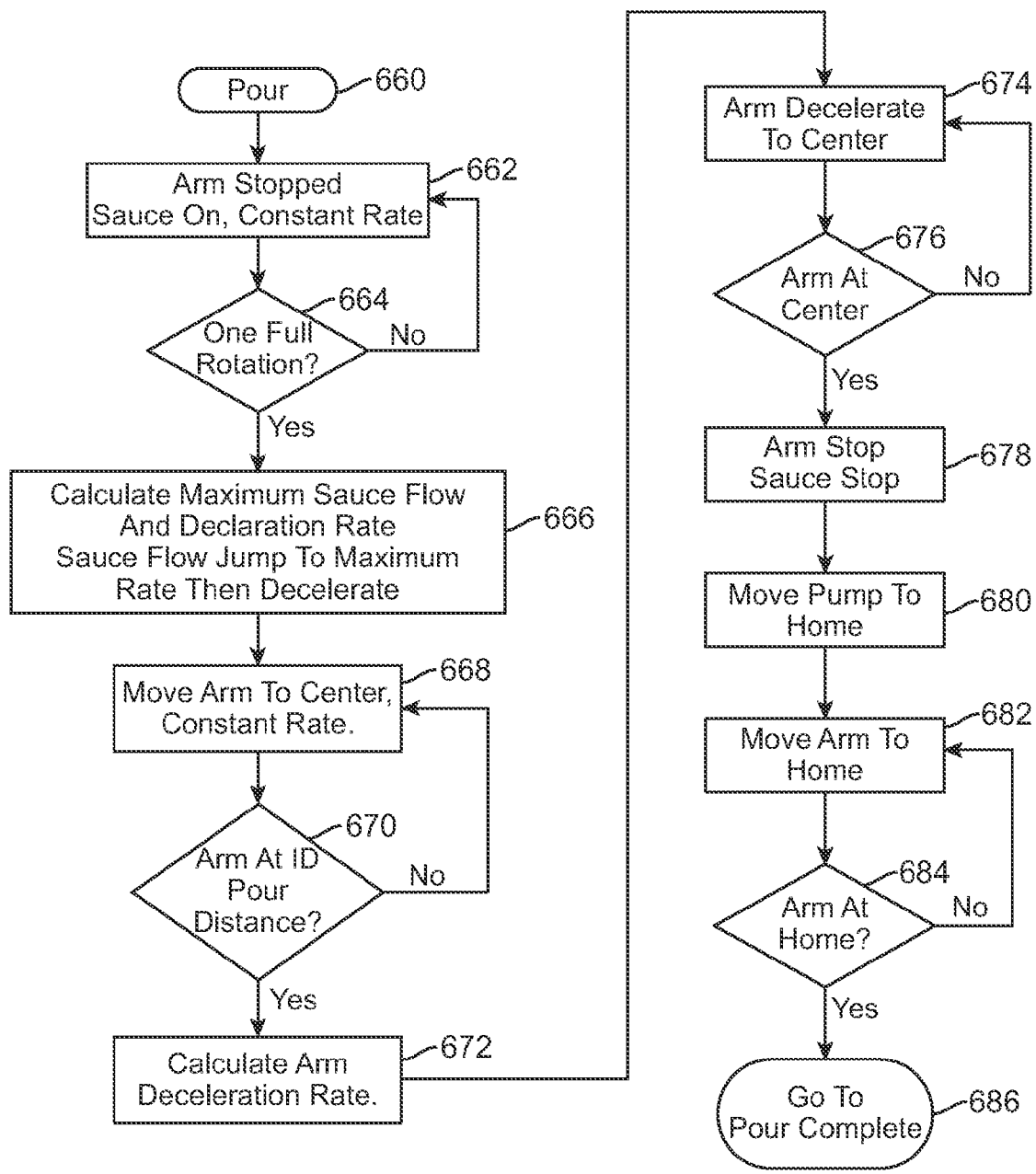
FIG. 6C shows a flow diagram of a method, according to one aspect of the invention.

FIG. 6C shows the detail of a method regarding operation 620 of FIG. 6A. At operation 660 the method begins, and sauce exits the linear arm. At operation 662 the linear arm is stopped, the sauce is flowing and the turntable is rotating at a constant rate. At operation 664 it is verified that one full rotation has occurred. At operation 666 the maximum sauce flow and deceleration rate is calculated, for a given pan size and desired sauce thickness. Sauce flow will decelerate as the linear arm is moved towards the center of the pan. At operation 668 the linear arm is moved towards the center of the pan at a constant rate. At operation 670 the linear arm position is verified to whether it is at a predetermined distance. At operation 672 the linear arm deceleration rate is calculated. At operation 674 the linear arm is decelerated to the center of the pan. At operation 676 it is verified whether the linear arm is at the center of the pan. At operation 676 the linear arm is at the center of the pan. At operation 678 the linear arm is stopped and the sauce is stopped. At operation 680 the pump is moved to a home position. At operation 682 the linear arm is moved to a home position. At operation 684 it is verified whether the linear arm is at a home position. At operation 686 the pour cycle is complete.

Figure 7A:
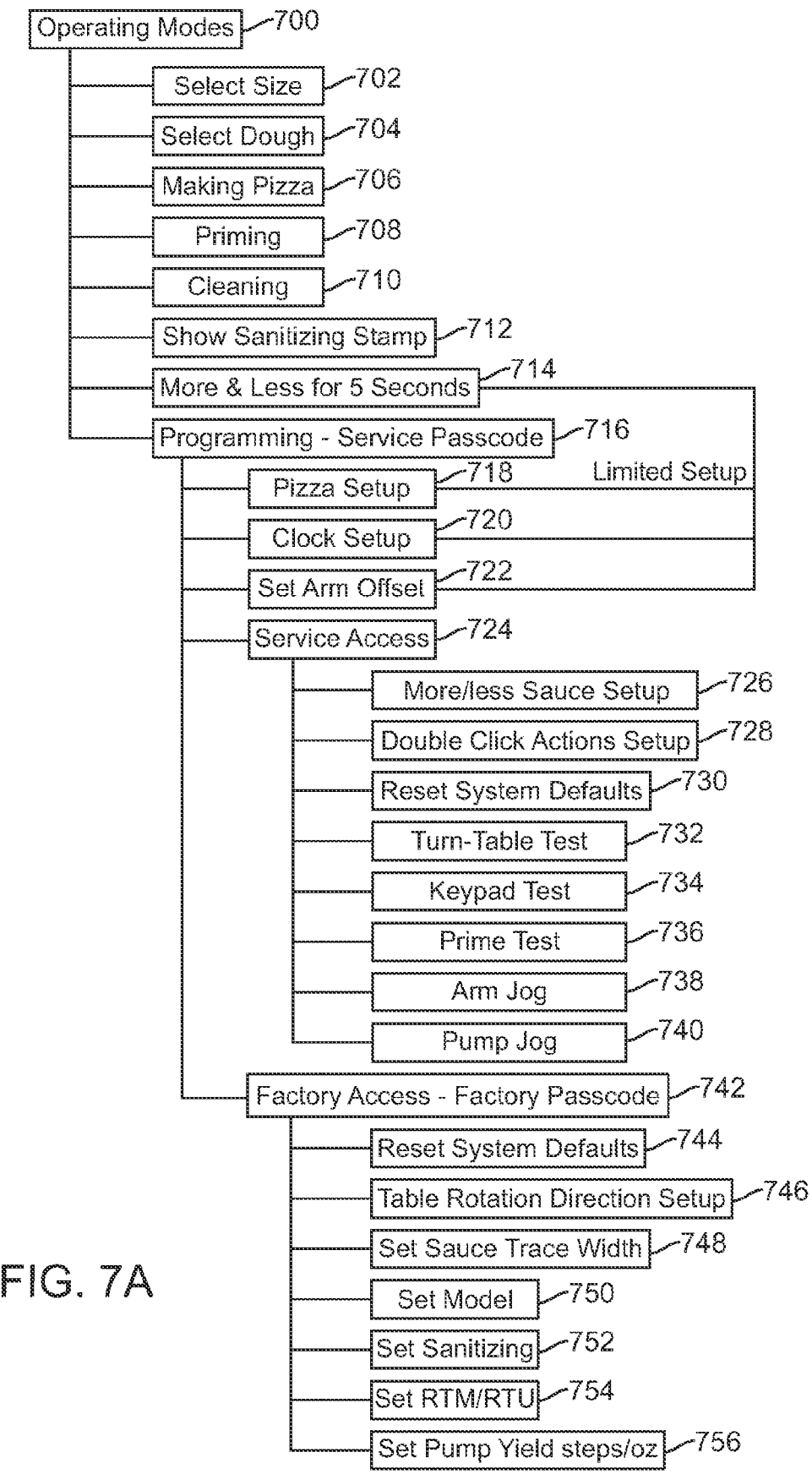
FIG. 7A shows a tree-diagram of menu items, according to one aspect of the invention.

FIG. 7A shows a chart of menu items which may be displayed on a touch screen or keyboard, for example on control panel 110, according to one aspect of the invention. Some menu items are preset at a factory and thus pass code protected, while others are not and thus are not pass code protected. Item 700 is an operating mode selection. Menu item 702 is an option for selecting pan size. Menu item 704 is an option for selecting dough type. Menu item 706 is an option to begin making a pizza. Menu item 708 is an option to prime the pump device. Menu item 710 is a cleaning option. Menu item 712 is an option to display the last time of cleaning. Item 714 activates limited setup options, which may not require a pass code to access.

Item 716 is for programming the apparatus, and requires a pass code for access. Service item 718 is a pizza setup option. Service item 720 allows access to program a clock. Service item 722 sets the linear arm offset. Service item 724 gives access to a deeper set of service items. Service item 726 allows more or less sauce delivery. Service item 728 is to set double click actions. Service item 730 resets service defaults. Service item 732 initiates a turntable test. Service item 734 initiates a keypad test. Service item 736 initiates a pump prime test. Service item 738 jogs the linear arm. Service item 740 jogs the pump device.

Service item 742 is for accessing factory setup of the apparatus and requires a pass code for access. Factory service item 744 resets system level defaults. Factory service item 746 sets the rotation direction. Factory service item 748 sets the sauce trace width. Factory service item 750 sets the model number. Factory service item 752 sets the sanitizing method. Factory service item 754 sets whether a ready to use or ready to make sauce is being used. Factory service item 756 sets the pump yield.

Figure 7B:
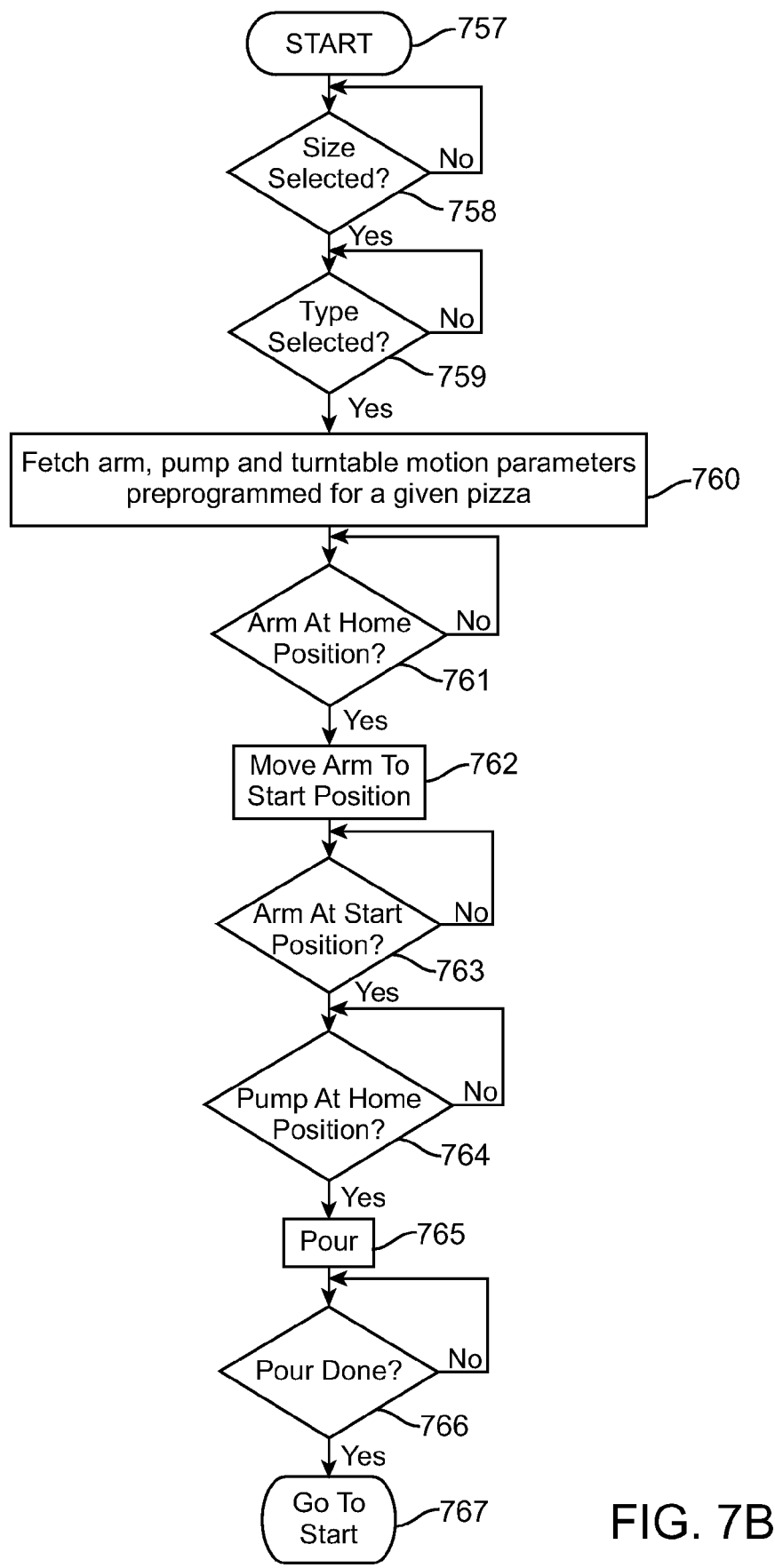
FIGS. 7B-7E show flow diagrams of a method, according to one aspect of the invention.

FIG. 7B shows a flow chart for a method for on-demand distribution of a liquid food-product, which may be implemented in apparatuses described herein, and preferably in an embedded computer such as shown in FIG. 5, according to one aspect of the invention. The method in FIG. 7B is implemented on an apparatus which does not include automatic pan size detection and where motion parameters of the apparatus are set by the user. The user may preferably use selectable menu items to define menu parameters, such as described in FIG. 7A. At operation 757 the method is started by the user. At operation 758 the user inputs a pan or pizza size. At operation 759 the user inputs a pizza type, for example thin crust or deep dish. At operation 760 an embedded computer retrieves variable parameters which are preprogrammed for the selected pan size and type of pizza. For example the parameters may be retrieved from a table stored in memory, for example on the control board 500. Variable parameters may include arm, pump, turntable, sauce pattern adjustment and run time parameters. In an alternative embodiment, operation 758 and/or 759 may be skipped and the apparatus is pre-set to a singular size and/or type of pizza. For example, the user would only have to place the pizza pan on top of the apparatus and initiate the sauce dispensing process by a singular selection of a "start button".

Pump parameters generally describe the motion and control of the pumping device described herein. Pump parameters may include sauce amount, for example the total amount of sauce to dispense in ounces. Pump parameters may also include pump outer diameter speed, for example the flow rate that sauce is dispensed while at an outer diameter pour. Pump parameters may also include pump start speed, for example the flow rate the pump moves up to after the outer diameter pour is completed. The pump start speed may be the maximum flow rate on the pour. Pump parameters may also include pump deceleration, for example how fast the pump decelerates from the pump start speed, as the arm travels to the center of the pizza. Pump parameters may also include pump outer diameter distance, which may be the distance the pump moves at the pump outer diameter speed.

Turntable parameters generally describe the motion and control of the turntable described herein. Turntable parameters may include turntable maximum speed, which may override a user's inputted value if exceeded. Turntable parameters may also include turntable outer diameter speed, for example may be the start up speed or minimum speed. Turntable parameters may also include turntable acceleration, for example the rate at which the turntable speed increases after the sauce distribution of the outer diameter has been completed. Turntable parameters may also include turntable outer diameter distance, for example the distance the turntable rotates while at the turntable outer diameter speed.

Arm parameters generally describe the motion parameters of the liner arm disclosed herein. Arm parameters may include arm start position, which may be the outer diameter position value, which decreases as the arm travels to the center of the turntable. Arm parameters may also include arm start speed, for example the initial arm speed after sauce has been distributed over the outer diameter. Arm parameters may also include arm acceleration, for example the rate at which the arm increases speed while traveling to the center of the turntable. Arm parameters may also include arm outer diameter distance, for example the distance the turntable turns until the arm begins moving towards the center of the turntable.

Pattern adjustment parameters are user inputs for more or less desired sauce. Pattern adjustment parameters include arm start position adjustment for more sauce. Pattern adjustment parameters may also include arm start speed adjustment for more sauce. Pattern adjustment parameters may also include arm start speed adjustment for less sauce.

Run time parameters may include less sauce distribution, for example desiring less sauce than a standard amount. Run time parameters may include more sauce distribution, for example desiring more sauce than a standard amount.

At operation 761 the arm is moved or verified to be in a home position. At operation 762 the arm is moved to the start position. At operation 763 the arm is verified to be in a start position. At operation 764 the pump is moved or verified to be in a home position. At operation 765 a pour operation is initiated. At operation 766 it is verified if the pour operation is complete. At operation 767 the method reinitializes to the start.

Figure 7C:
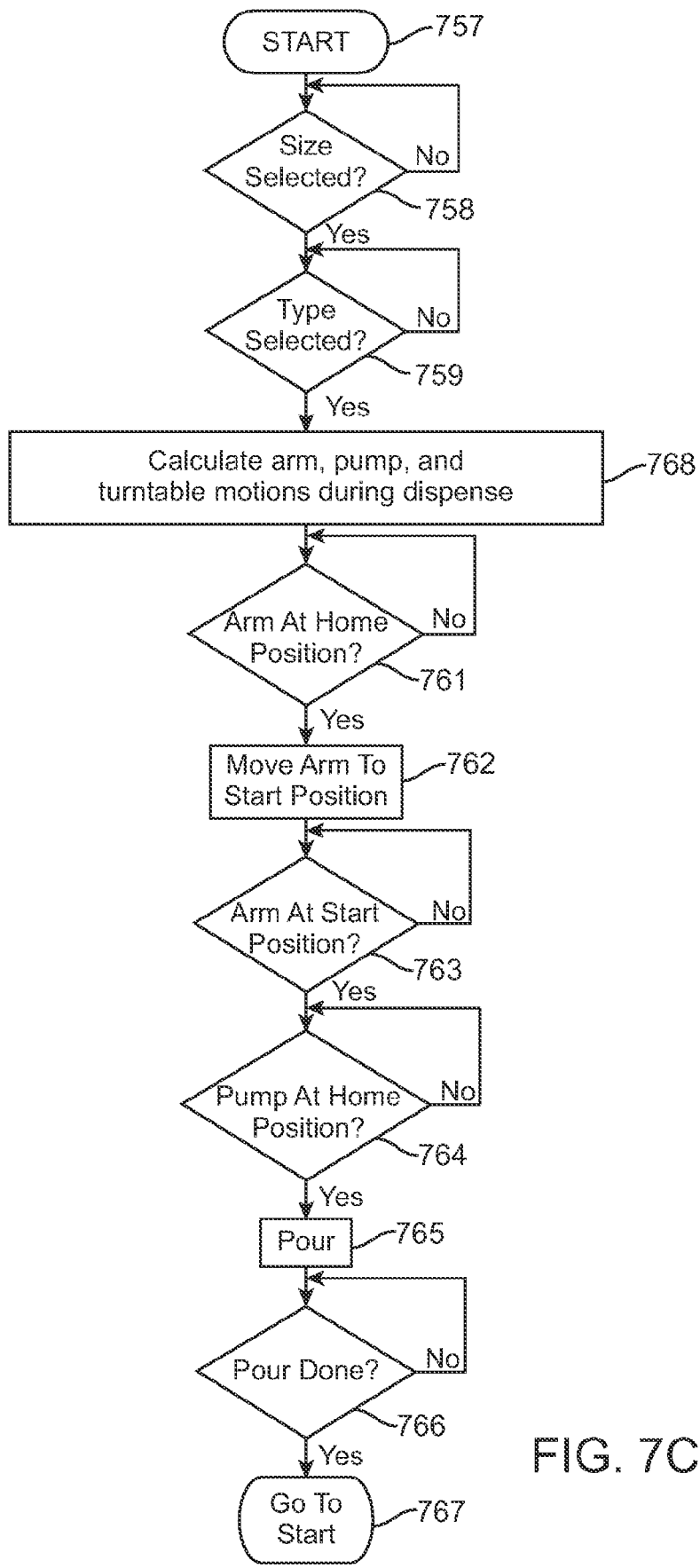

FIG. 7C shows a flow chart for a method for on-demand distribution of a liquid food-product, which may be implemented in apparatuses described herein, and preferably in an embedded computer such as shown in FIG. 5, according to one aspect of the invention. The method in FIG. 7C is implemented on an apparatus which does not include automatic pan size detection and where motion parameters of the apparatus are automatically calculated. The method implemented in FIG. 7C is substantially similar to the method disclosed in FIG. 7B. However, in operation 768 variable parameters are calculated based upon the size and type of pizza selected. The parameters may be calculated from preset user defined parameters which remain constant. For example, total sauce amount or turntable speed.

Figure 7D:
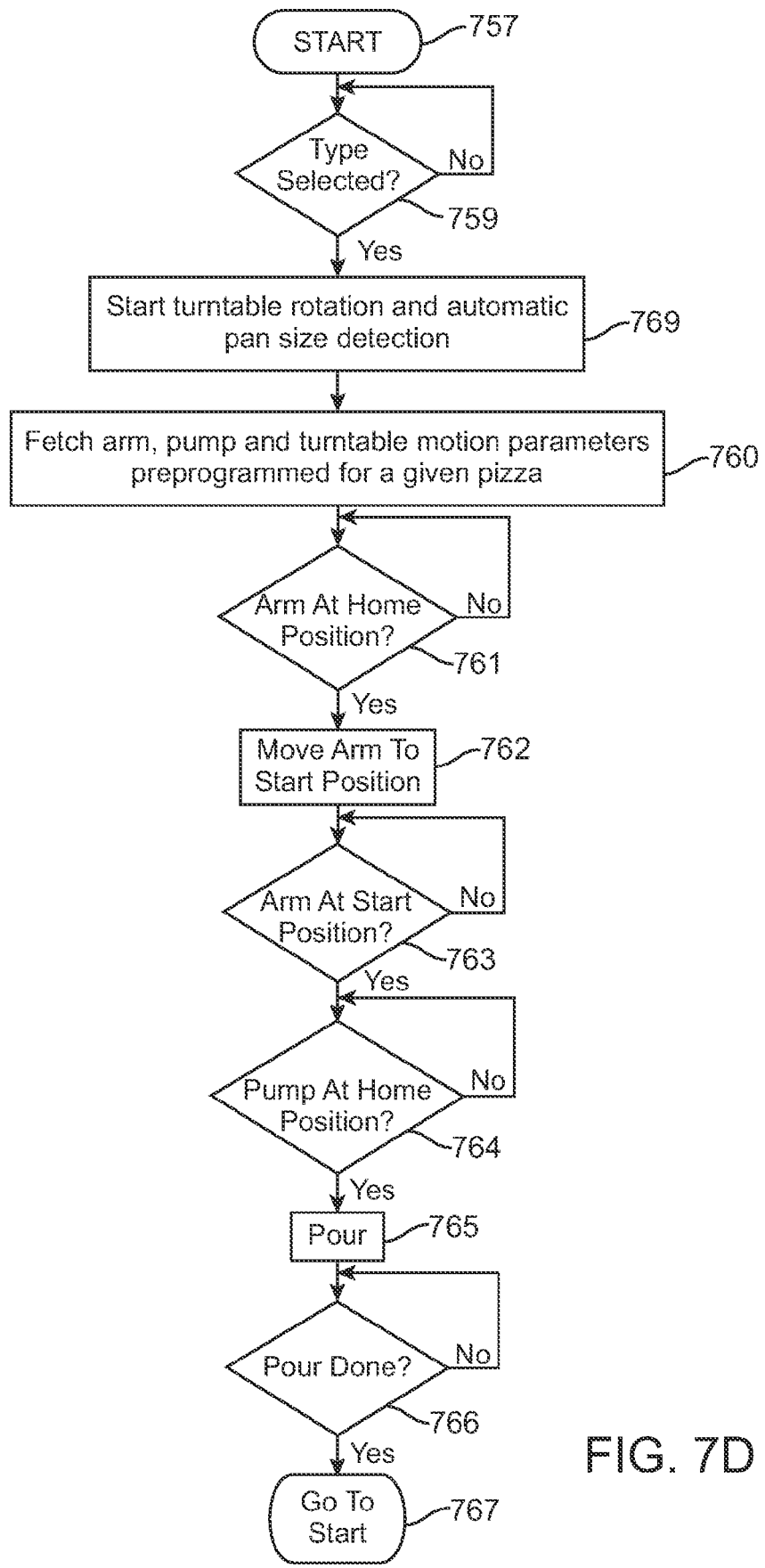

FIG. 7D shows a flow chart for a method for on-demand distribution of a liquid food-product, which may be implemented in apparatuses described herein, and preferably in an embedded computer such as shown in FIG. 5, according to one aspect of the invention. The method in FIG. 7C is implemented on an apparatus which includes automatic pan size detection and where motion parameters of the apparatus are set by the user. The method implemented in FIG. 7D is substantially similar to the method disclosed in FIG. 7B. However, in operation 769 the pan or pizza size is automatically detected, and thus does not require user input. In an alternative embodiment, operation 759 may be skipped when the apparatus is pre-set to a singular size and/or type of pizza. For example, the user would only have to place the pizza pan on top of the apparatus and initiate the sauce dispensing process by a singular selection of a "start button".

Figure 7E:
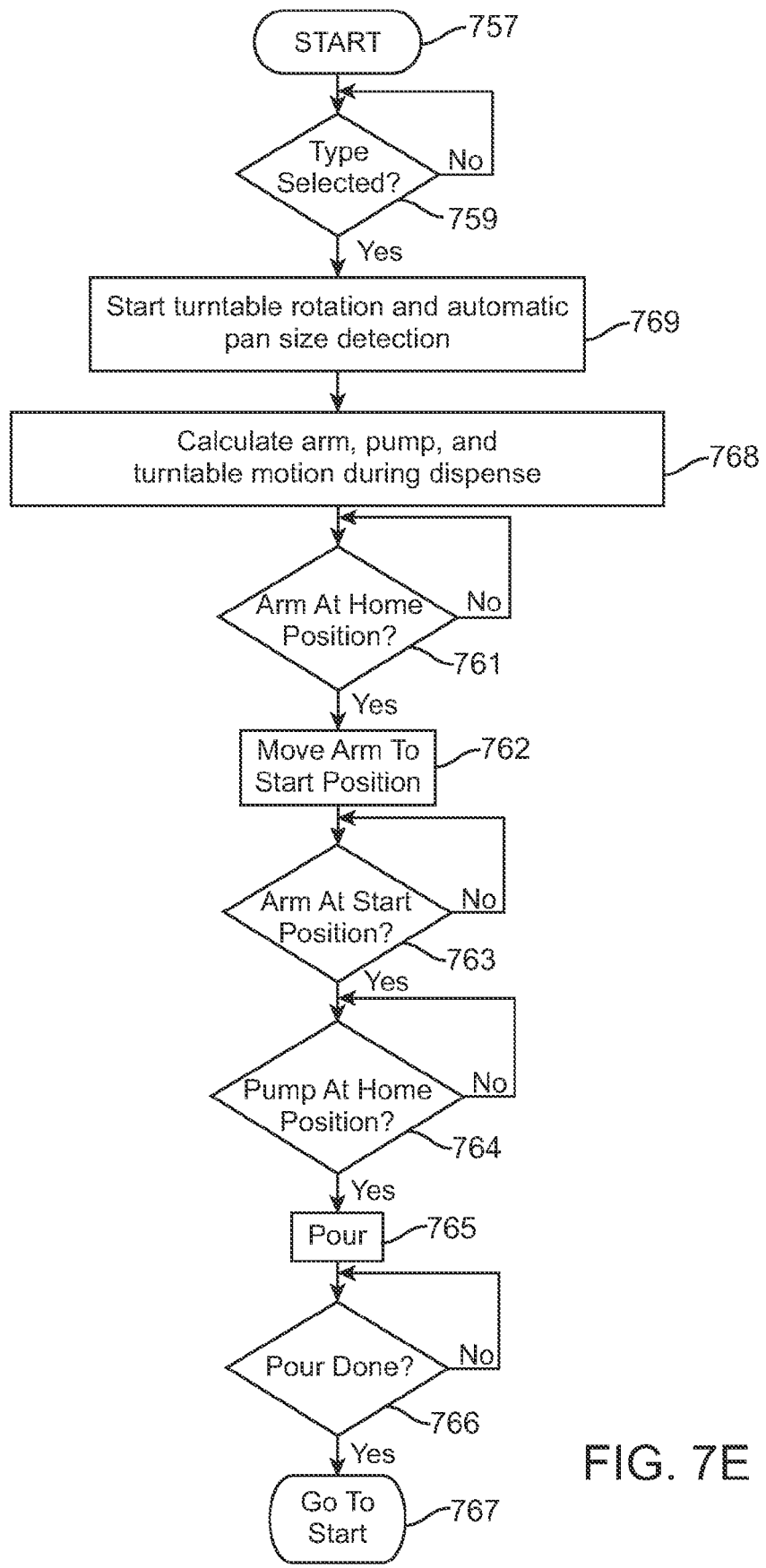

FIG. 7E shows a flow chart for a method for on-demand distribution of a liquid food-product, which may be implemented in apparatuses described herein, and preferably in an embedded computer such as shown in FIG. 5, according to one aspect of the invention. The method in FIG. 7E is implemented on an apparatus which includes automatic pan size detection and where motion parameters of the apparatus are automatically calculated. The method implemented in FIG. 7E is substantially similar to the method disclosed in FIG. 7B. However, in operation 768 variable parameters are calculated based upon the size and type of pizza selected. The parameters may be calculated from set user defined parameters which remain constant. For example, total sauce amount or turntable speed. Also in operation 769 the pan or pizza size is automatically detected, and thus does not require user input.

Figure 7F:
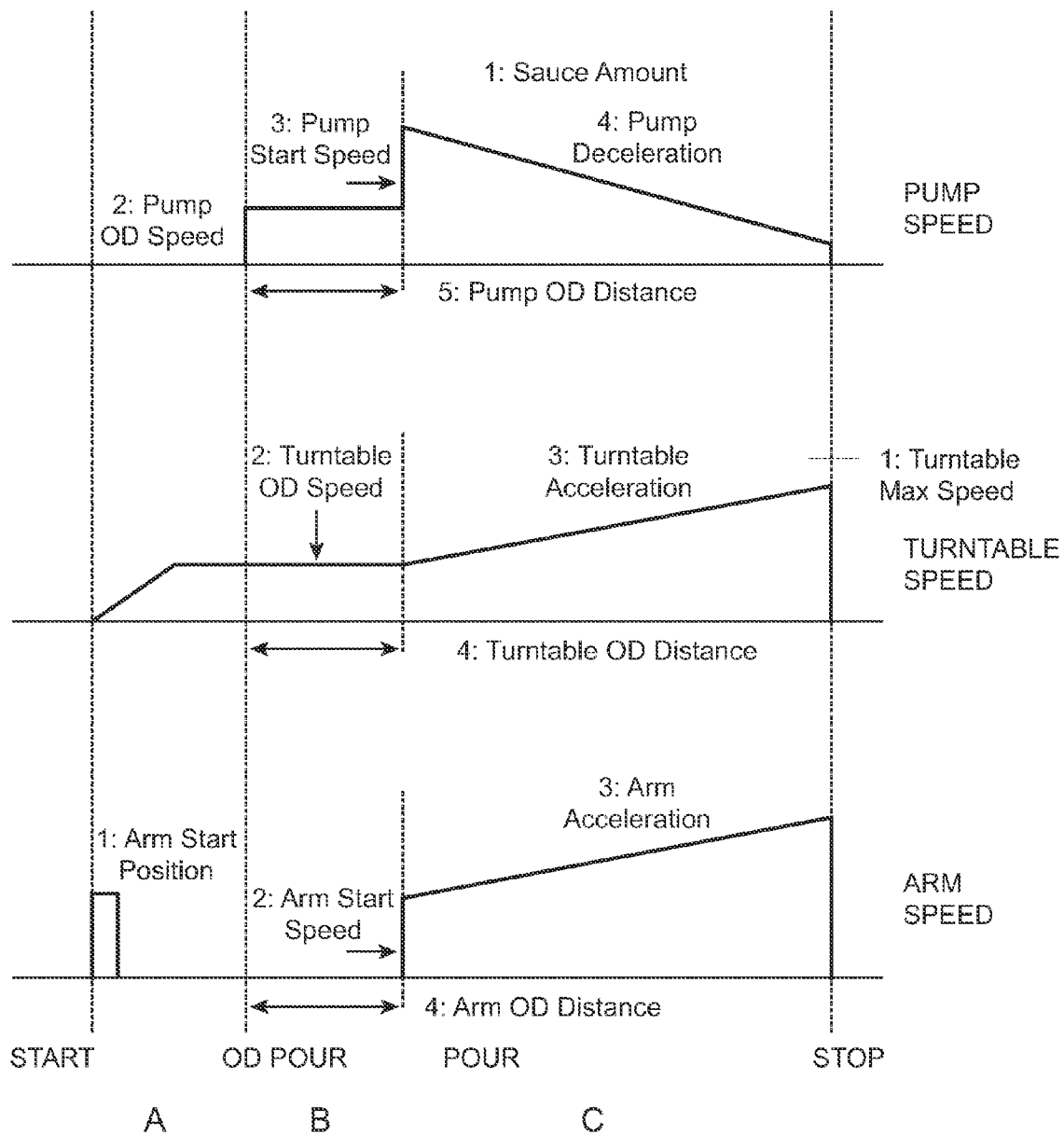
FIG. 7F shows a temporal diagram of a method, according to one aspect of the invention.

FIG. 7F shows the temporal relationships between pump speed, turntable speed and arm speed during a sauce pour operation, such as operation 765 shown in FIGS. 7B through 7E, according to one aspect of the invention. Zone A shows a temporal zone between the initiation of the pour cycle and the start of the outer diameter sauce pour. In Zone A the pump speed is zero, and simultaneously the turntable speed is ramped up to an initial speed which is suitable for dispensing sauce over the outer diameter of a pizza, and simultaneously the arm is moved to an initial start position which is suitable for dispensing sauce over the outer diameter of a pizza. Zone B shows a temporal zone where sauce is being distributed over the outer diameter of the pizza. In Zone B the pump is pumping at a constant pump speed, to pump sauce out of the sauce dispenser, and simultaneously the turntable is rotating at a constant rate, and simultaneously the arm speed is zero. Zone C shows the temporal zone when sauce is being distributed over the remainder of the pizza. In Zone C the pump speed is immediately accelerated to a higher rate and gradually decelerated as the arm travels towards the center of the pizza, and simultaneously the turntable speed is accelerated to a maximum speed, and simultaneously the arm is accelerated as the arm reaches the center of the pizza. The operation is completed when a pre-determined amount of sauce has been distributed. The rates of acceleration and deceleration show in FIG. 7F are illustrative and may thus vary from what is shown. The relationships shown in FIG. 7F are particularly advantageous because they allow flexibility of specific operational parameters. For example a single parameter, such as maximum turntable speed may be preset, and thus the remaining parameters will be calculated by or retrieved from to allow for even sauce distribution. More than one parameter may also be preset.

Figure 8A:
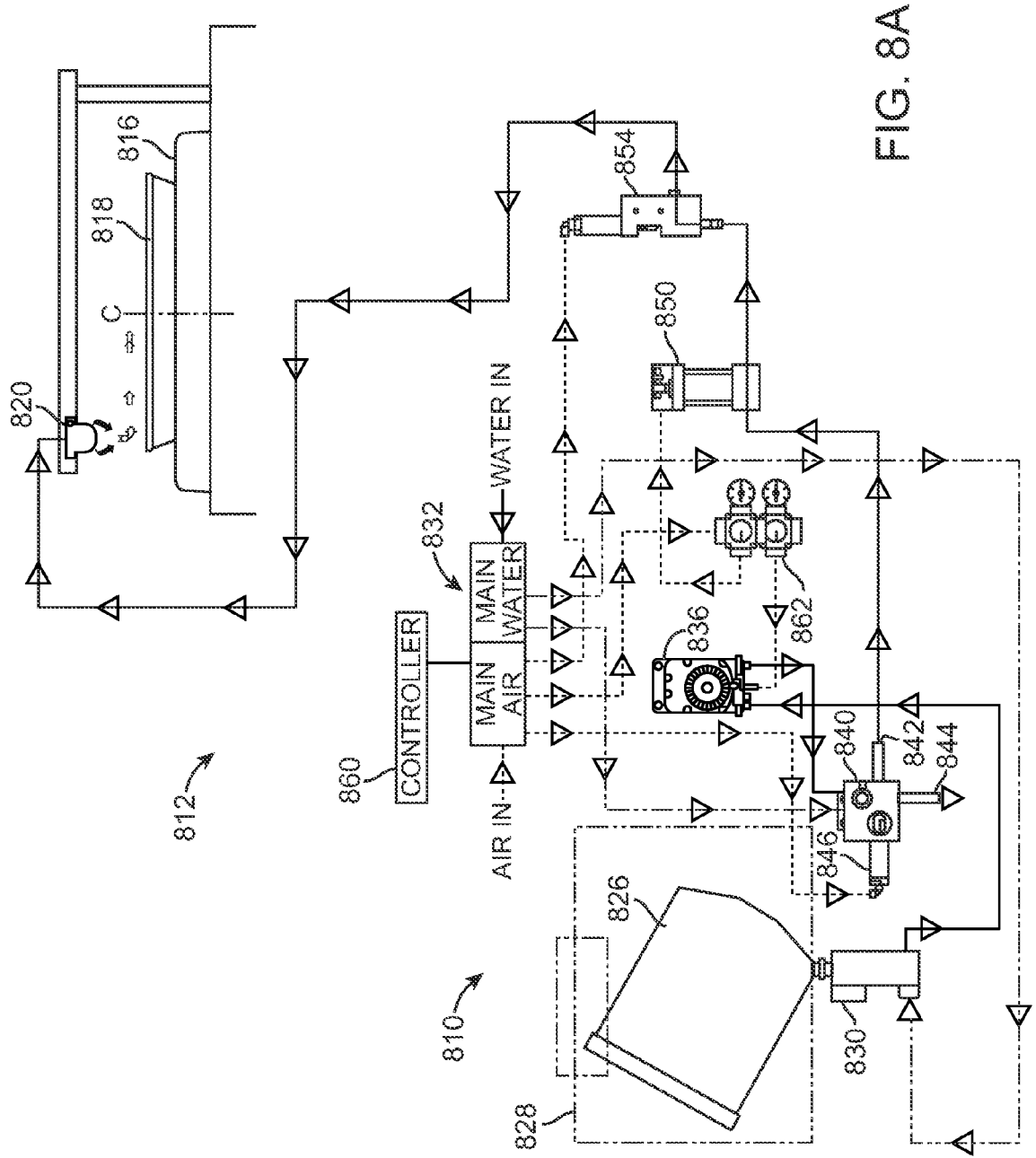
FIG. 8A shows a schematic diagram of an apparatus, according to one aspect of the invention.

FIG. 8A shows a product reconstitution apparatus 810 for a sauce dispensing system 812, according to one aspect of the invention. In the specific embodiment shown, the system 812 is a pizza sauce dispensing system having a rotating base 816 supporting a pizza pan 818 to receive a sauce from a nozzle 820. The sauce is provided by the product reconstitution apparatus 810.

The sauce is made from a fluid product which is diluted to the desired density or consistency. The fluid product is typically supplied from a bag or container 826 which is reusable and/or replaceable. The product container 826 may be placed in a product hopper 828, which is desirably designed to drain the product through a spout or the like from the bottom of the container 826. This allows a higher percentage of evacuation of the fluid product from the container 826, and shortens the distance (thereby increasing the pressure) from the product source to the pump inlet. The outlet of the container 826 is connected to the inlet of a mixing device 830, which mixes and dilutes the fluid product with water to make the sauce or product mixture. Water is supplied via a distribution block 832. The spout delivers the product via an adaptor that connects from the product container into the mixing chamber of the mixing device 830. The mixing chamber may also incorporate a shutoff feature for drip free container transfer, and maximizes the available flow area for increased pressure to the pump inlet. In some cases, the product in the product container 826 is ready to use without the need for dilution, and the water to product ratio is zero. In other cases, the water to product ratio may be higher than one.

The product mixture is pumped by a pump 836 to a diverter valve 840, which also receives water from the distribution block 832. The water is used to mix with the product mixture from the mixing device 830 and further dilute the mixture. The diverter valve 840 has two outlets for outputting sauces of different densities. The first outlet 842 outputs a sauce that is higher in density than the sauce from the second outlet 844. The first outlet 842 may provide a sauce for saucing pizzas, while the second outlet 844 may provide a sauce for breadsticks. The diverter valve 840 includes an air-operated valve member 846 which is to direct the product mixture flow to one of the two outlets. Air is supplied via the distribution block 832. A flow compensator 850 is desirably provided to compensate for flow rate fluctuations caused by, for instance, transition periods and pump cycling effects. A shut-off valve 854 is provided between the product reconstitution apparatus 810 and the dispensing nozzle 820. The flow compensator 850 and shut-off valve 854 may be activated by air from the distribution block. A controller 860 is provided to control the air flow and water flow to the mixing device 830, diverter valve 840, pump 836, flow compensator 850, and shut-off valve 854, thereby controlling the operation of these components. In the specific embodiment shown in FIG. 8A, a gauge 862 may be provided to set the air pressure for the pump 836 and flow compensator 850. The controller 860 may be any suitable device, such as a programmable logic controller (PLC). The controller 860 controls the flow of the fluid product and water to produce a product mixture on demand when the controller 860 receives an input indicating the product mixture is needed, for instance, when the operator presses a button on a control panel to send an input control signal to the controller 860. In addition, the controller 860 is operable to vary the specific ratio of the water to the fluid product on demand to produce a different product mixture having a different consistency when the controller 860 receives an input indicating the different consistency is needed or desired.

Figure 8B:
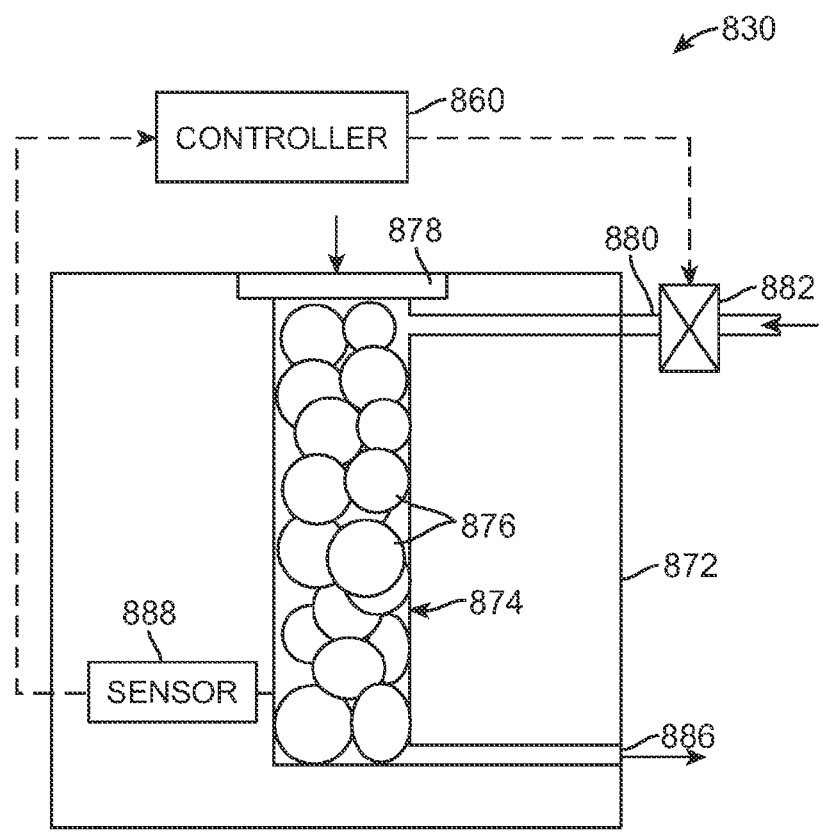
FIG. 8B shows a schematic diagram of an apparatus, according to one aspect of the invention.

FIG. 8B shows the mixing device 830 in greater detail. The mixing device 830 includes a housing 872 with a mixing chamber 874 containing agitating elements such as static mixing spheres 876. The fluid product enters the mixing chamber 874 via a product inlet 878. A diluting fluid such as water enters the mixing chamber 874 via a diluting fluid inlet 880. A valve 882 such as a solenoid is provided for on/off control of the water flow into the mixing chamber 874. The static mixing spheres 876 agitate the fluid product and the diluting fluid as they flow through the mixing chamber 874 to mix the two to obtain the desired product consistency. The diluted fluid product or product mixture exits the mixing chamber 874 via an outlet 886. A pressure sensor or transducer 888 may be provided to detect the pressure in the mixing chamber 874. When the pressure falls below a preset minimum indicating that there is insufficient fluid product in the mixing chamber 874, the transducer 888 sends a signal to the controller 860 which will shut the system down to allow the product container 826 to be replaced. For instance, the controller 860 will turn the water valve 882 off to stop the water flow into the mixing chamber 874.

Figure 8C:
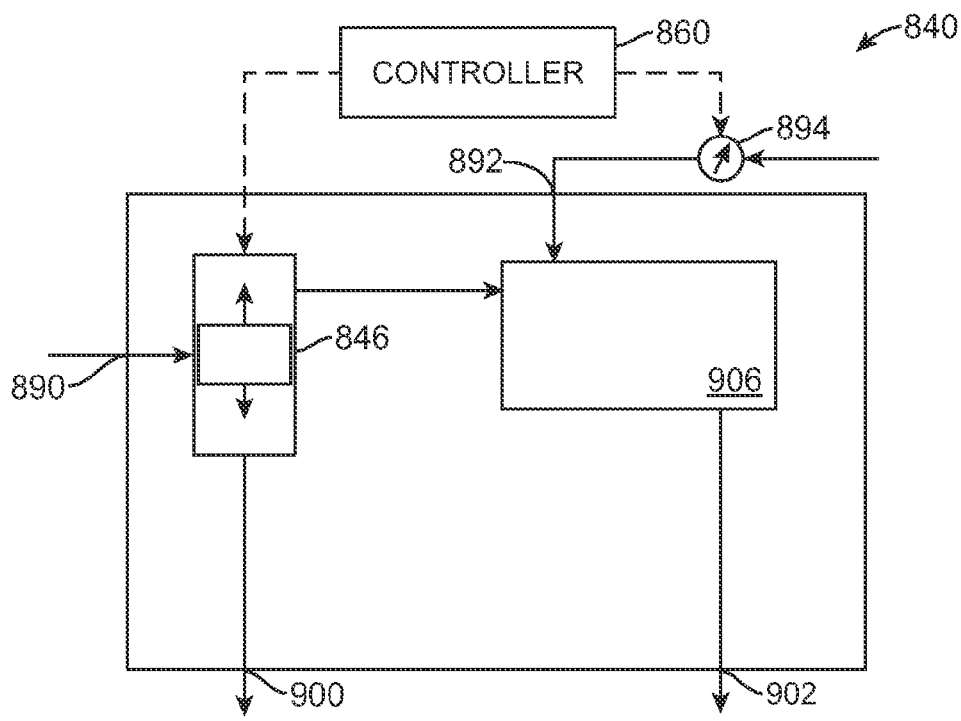
FIG. 8C shows a schematic diagram of an apparatus, according to one aspect of the invention.

In FIG. 8C, the diverter valve 840 includes a first inlet 890 to receive a flow of the product mixture from the outlet 886 of the mixing device 830, and a second inlet 892 to receive a diluting fluid such as water. A flow controller 894 is desirably provided to control the water flow rate into the diverter valve 840. The diverter valve 840 has a first outlet 900 and a second outlet 902 for outputting mixtures of different densities having different percentages of the diluting fluid. Under the control of the valve member 846, a first mix flows out of the first outlet 900 along a first flow path and the second mix flows out of the second outlet 902 along a second flow path. In the specific embodiment shown, the product mixture from the mixing device 830 flows through the diverter valve 840 to the first outlet 900 without further dilution. It is understood that in other embodiments, there may be some further dilution by mixing a diluting fluid with the product mixture for the first outlet 900. The product mixture is mixed with the diluting fluid in a mixing area 906 to form a diluted product mixture which is directed to the second outlet 902. In a specific embodiment, the diluted product mixture has twice the amount of water as the product mixture before dilution. The controller 860 desirably controls the flow controller 894 which sets the water flow rate into the diverter valve 840 and any other devices, so as to control, on demand, the flow and consistency of the first mix and the flow and consistency of the second mix.

The valve member 846 is movable between a first position to block flow to the second outlet 902 and direct a flow of the first mix (product mixture) through the first outlet 800, and a second position to block flow to the first outlet 900 and direct a flow of the second mix (diluted product mixture) through the second outlet 902. In alternative embodiments, a single outlet may be used for both mixtures. The movement of the valve member 846 and the water flow controller 894 are controlled by the controller 860 and may be actuated by compressed air.

Figure 8D:
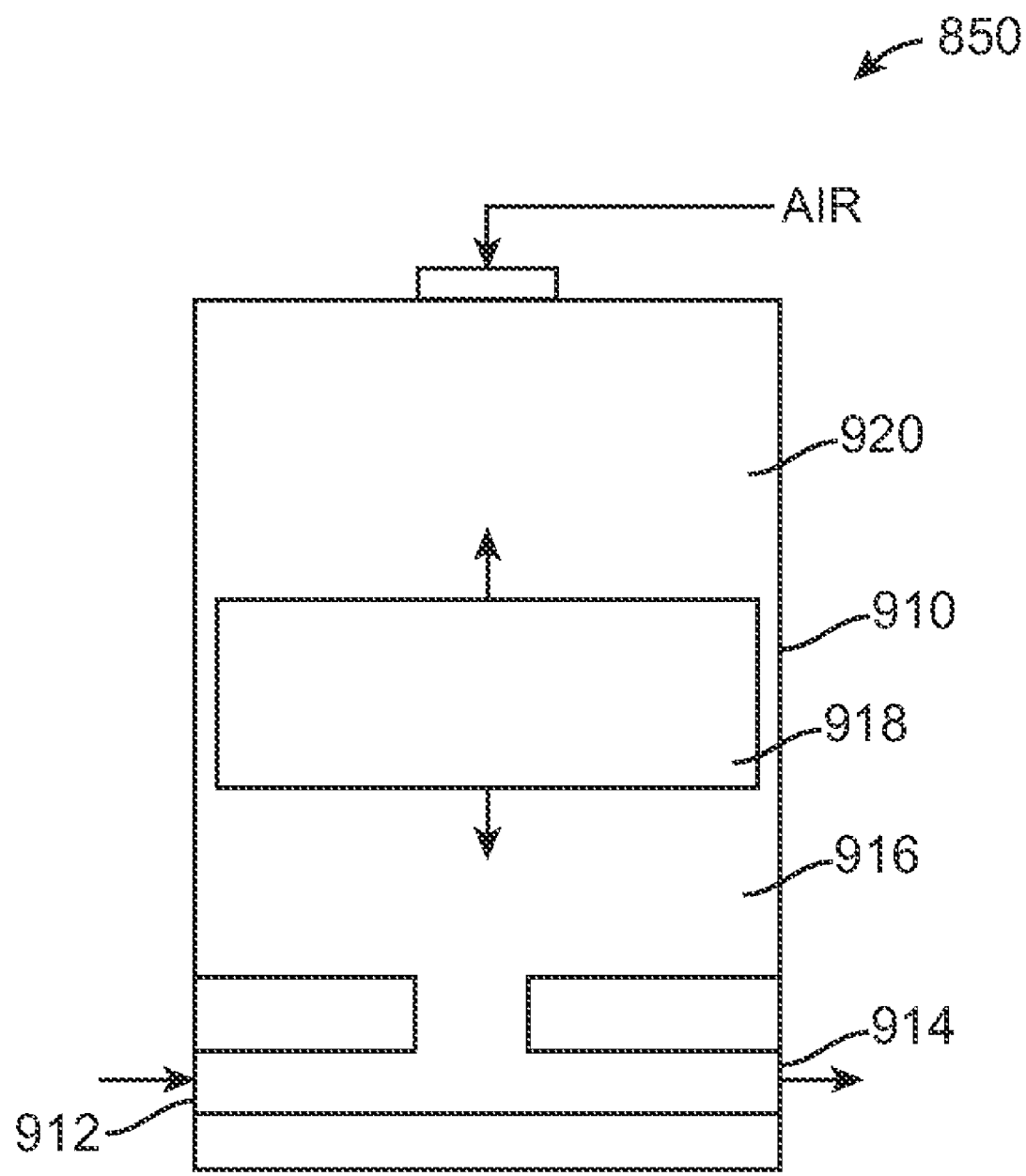
FIG. 8D shows a schematic diagram of an apparatus, according to one aspect of the invention.

FIG. 8D shows an embodiment of the flow compensator 850 having a compensator housing 910, according to one aspect of the invention. The product mixture from the first outlet 900 of the diverter valve flows into the housing 910 via an inlet 912 and exits the housing 910 via an outlet 914. The compensator housing 910 includes an accumulation chamber 916 for accumulating the product mixture. The size of the accumulation chamber 916 is adjustable by movement of a piston 918 or the like. On the opposite side of the piston 918 is a pressurized air region 920. The air pressure in the pressurized air region 920 is controlled by the controller 860, and is typically fixed at a preset level (e.g., about 30-35 psi) to produce a desired flow rate of the product mixture. When there is fluctuation of the product mixture flow, the piston 918 will move due to the pressure differential between the accumulation chamber 916 and the pressurized air region 920 to compensate for the fluctuation. For instance, the pressure typically drops immediately after the shut-off valve 854 is turned on to permit the flow of product mixture to the dispensing nozzle 820. To compensate for the drop, the air in the pressurized air region 920 will push the piston 918 down to add the accumulated product mixture to the flow to maintain a more uniform flow of the product mixture. When the pressure of the product mixture flow builds, it pushes the piston 918 up and causes accumulation of the product mixture in the accumulation area 916 of the flow compensator 850. Flow fluctuations can be caused by transition periods, pump cycling effects, or the like.

Figure 9:
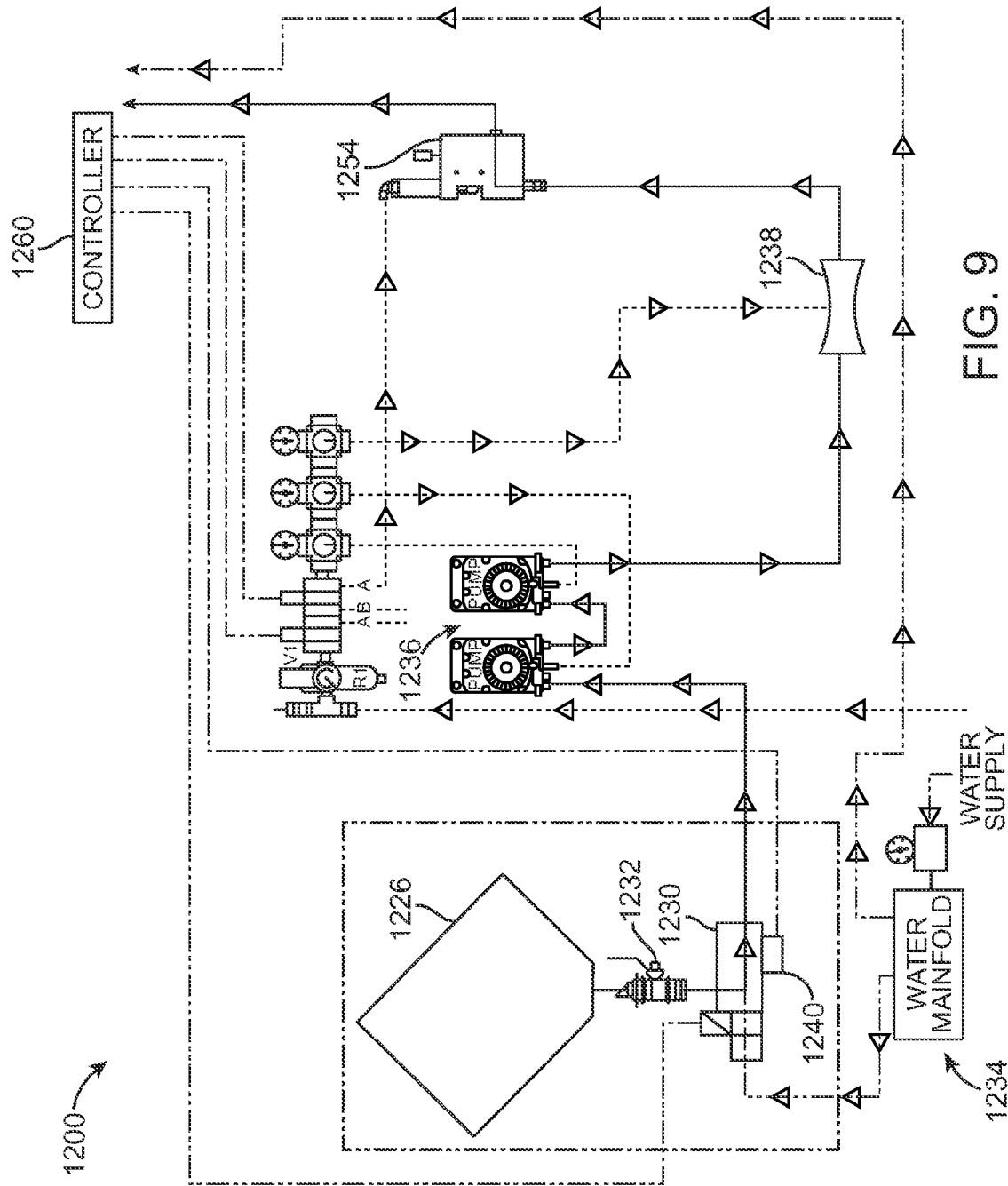
FIG. 9 shows a schematic diagram of an apparatus, according to one aspect of the invention.

FIG. 9 shows another embodiment of the product reconstitution apparatus 1200. The apparatus 1200 includes a product container 1226 and a mixing device 1230. A shutoff valve 1232 may be disposed between the product container 1226 and the mixing device 1230. Water is supplied from a water source 1234 to the mixing device 1230. A pneumatic pump system 1236 includes a pair of pumps in series for pumping the product mixture from the mixing device 1230 through a pinch valve 1238 to a shutoff valve 1254. The pinch valve 1238 and the shutoff valve 1254 are pneumatically controlled. The pinch valve 1238 is used to reduce flow rate fluctuations. A controller 1260 controls the components in the apparatus 1200 to provide the product mixture for dispensing. A sold out switch 1240 is provided to send a sold out signal to the controller 1260 when the mixing device 1230 is empty or near empty, for instance, when a low pressure is detected.

Figure 10:
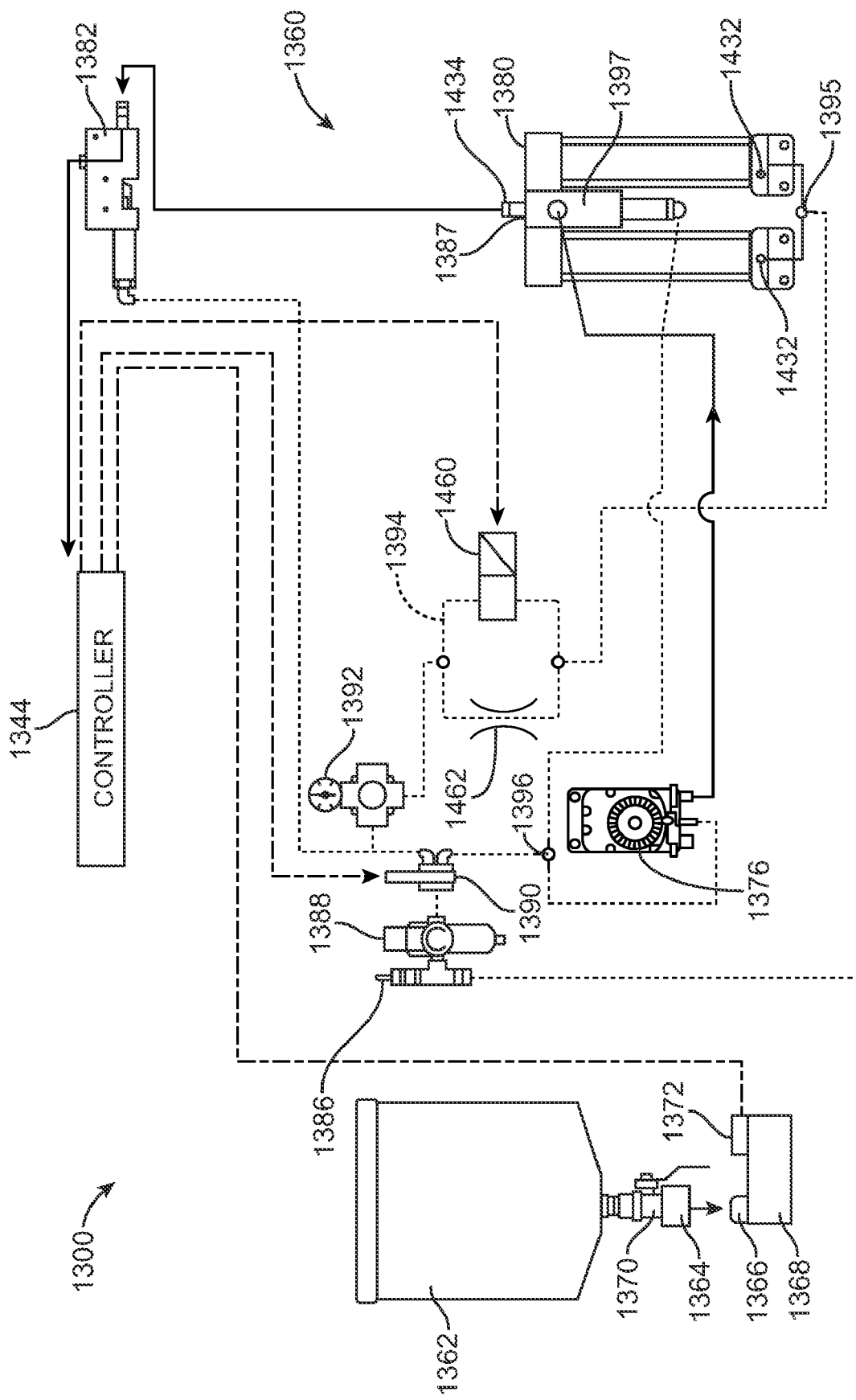
FIG. 10 shows a schematic diagram of an apparatus, according to one aspect of the invention.

FIG. 10 shows another embodiment of the product reconstitution apparatus 1300, according to one aspect of the invention. The sauce is provided in a container such as a hopper or a vat 1362. The vat 1362 is desirably re and replaceable, and includes an outlet 1364 that mates with an inlet 1366 of a pre-mix inlet adapter 1368. The outlet 1364 and inlet 1366 may form a vacuum sealed connection. A valve 1370 such as a ball valve is provided near the outlet 1364 of the vat 1362, and can be opened after the connection is formed between the vat 1362 and the adapter 1368. An empty hopper sensor 1372 is provided in the adapter 1368 to sense and inform the controller 1344 if the hopper 1362 is empty and needs to be replaced. The pre-mix inlet adapter 1368 pre-mixes the sauce for improved consistency. The sauce is driven by a pump 1376 through an accumulator assembly 1380 having an inlet, and then to the dispensing apparatus. A shut-off valve 1382 is desirably provided near the dispenser to shut off the sauce flow when appropriate to minimize dripping.

The pump 1376 is typically a hydraulic pump such as a double diaphragm pump, but may be any suitable type of pump. A compressed gas or air source supplies a gas or air through a safety valve 1386 and a filter regulator 1388 to a four-way valve 1390, which serves as a control member or control valve for controlling operation of the pumping system 1360. The four-way valve 1390 has two positions. In position A, the four-way valve 1390 directs air flow through a pressure regulator 1392 to the shut-off valve 1382 and through an air flow reduction circuit 1394 via a T-connector 1395 to the accumulator 1380. In position B, the four-way valve 1390 is coupled via a T-connector 1396 to the pump 1376 and to a diverter valve 1397 disposed at the outlet of the accumulator assembly 1380.

The accumulator assembly 1380 includes two accumulator chambers. Each accumulator chamber includes a gas inlet 1432, a common outlet 1434, and a piston disposed therebetween. The diverter valve 1397 is actuatable to open and close the inlet, thereby allowing or blocking sauce flow into the chambers. The diverter valve 1397 as shown is actuatable by air through an air cylinder to move between an open position and a closed position. In the dispense mode, the diverter valve 1397 is in the closed position to close the inlet from the pump 1376. In the recharge mode, the diverter valve 1397 is in the open position to open the inlet from the pump 1376.

Prior to dispensing the sauce, the pump 1376 pumps the sauce from the vat 1362 to the accumulator chambers of the accumulator assembly 1380. The air source supplies air through the safety valve 1386 and the filter regulator 1388 to the four-way valve 1390. The controller 1344 sets the valve 1390 to the recharge mode at position B. The air flows through the T-connector 1396 to the air cylinder of the diverter valve 1397 to close the outlet 1434 of the accumulator assembly 1380. The air also flows to the pump 1376 to pump the sauce to the accumulator inlet to fill the accumulator chambers. After the recharge of the sauce in the accumulator assembly 1360 is completed, the controller 1344 switches the four-way valve 1390 to the dispense mode at position A. The pump 1376 is deactivated and the diverter valve 1397 returns to the open position to permit sauce flow from the accumulator chambers through the accumulator outlet 1434. Air flows through the pressure regulator 1392 to the shut-off valve 1382 to switch it from the closed position to the open position to permit sauce flow to the dispenser. The operation and additional details of the accumulator assembly 1380 and pumping system are provided in co-assigned patents: U.S. Pat. No. 6,892,629, U.S. Pat. No. 6,892,901, and U.S. Pat. No. 7,074,277, the entireties of which were herein incorporated by reference above, as well as U.S. Pat. No. 6,969,051 the entirety of which is herein incorporated by reference.

Figure 11:
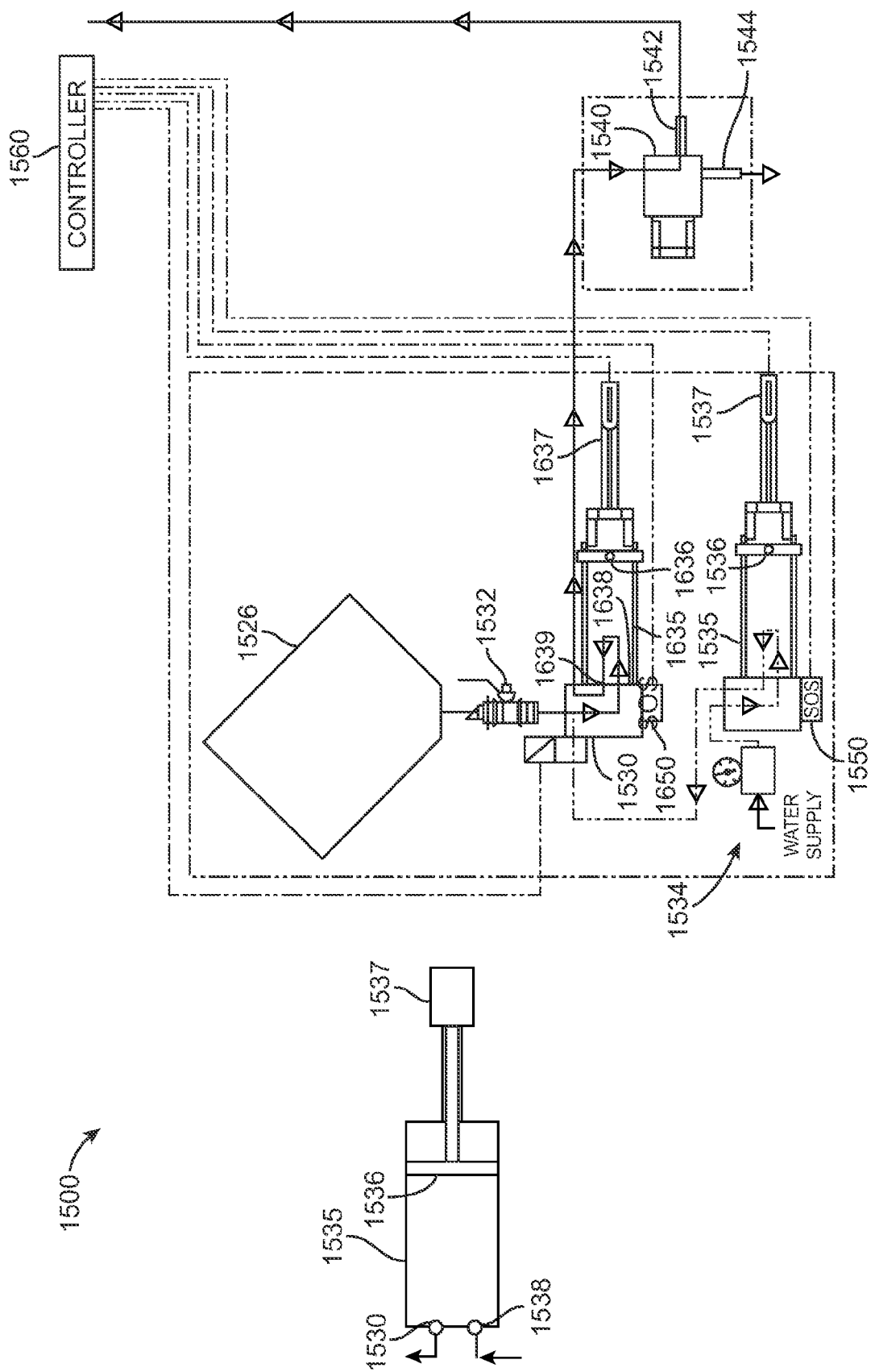
FIG. 11 shows a schematic diagram of an apparatus, according to one aspect of the invention.

In another embodiment of the product reconstitution apparatus 1500 illustrated in FIG. 11, a product container 1526 supplies a product to a mixing device 1530, and a shutoff valve 1532 may be provided between the container 1526 and the mixing device 1530. The mixing device 1530 may be any suitable mixer, such as a static venturi mixer. Water is supplied from a water source 1534 to the mixing device 1530. The water flows into a water chamber 1535 having a movable piston 1536 driven by a motor 1537, which is desirably a variable stepper motor that drives the piston 1536 along the full range of on-demand dosage when water is demanded. As seen more clearly in the enlarged view, the water chamber 1535 includes an inlet check valve 1538 at the inlet and an outlet check valve 1539 at the outlet. When the piston 1536 is pulled to the right, the pressure drop in the chamber 1535 closes the outlet check valve 1539 and opens the inlet check valve 1538 to draw in the water through the inlet. When the piston 1536 is pushed to the left, the pressure rise in the chamber 1535 closes the inlet check valve 1538 and opens the outlet check valve 1539 to dispense the water through the outlet. When the piston 1536 stops, the water flow also stops. A sold out switch 1550 is provided to send a sold out signal to the controller 1560 when the water supply pressure is low. Similarly, the product mixture chamber 1635 includes an inlet check valve 1638 at the inlet and an outlet check valve 1639 at the outlet. When the piston 1636 is pulled to the right by the motor 1637, the pressure drop in the chamber 1635 closes the outlet check valve 1639 and opens the inlet check valve 1638 to draw in the mixture through the inlet. When the piston 1636 is pushed to the left, the pressure rises in the chamber 1635 closes the inlet check valve 1638 and opens the outlet check valve 1639 to dispense the mixture through the outlet. When the piston 1636 stops, the product mixture flow stops. A sold out switch 1650 is provided to send a sold out signal to the controller 1560 when the mixing device 1530 is empty or near empty, for instance, when a low pressure is detected. Thus, the product mixture is provided on demand, and no shutoff valve is needed downstream. The motor 1637 is desirably a variable stepper motor that drives the piston 1636 along the full range of on-demand dosage when product mixture is demanded.

The chambers 1535, 1635 are cylindrical in shape, and the pistons 1536, 1636 are along the axes of the chambers 1535, 1635, respectively. An optional diverter valve 1540 may be provided to provide a first mix through a first outlet 1542 and a second mix through a second outlet 1544, as described above for the embodiment shown in FIG. 8. The controller 1560 controls the motors 1537, 1637 and other components of the apparatus 1500 to provide the product mixture on demand to the dispenser.

The above-described arrangements of apparatus and methods are merely illustrative of applications of the principles of this invention and many other embodiments and modifications may be made without departing from the spirit and scope of the invention as defined in the claims. For example, a secondary pump may be used between the diverter valve 840 and the shutoff valve 854. Tubings in different lengths and inner diameters may be used between the pump 836 and the shutoff valve 854 and between the shutoff valve 854 and the dispensing nozzle 820 to control flow and back pressure in order to achieve consistency. A pinch valve may be added between the pump 836 and the shutoff valve 854 to control flow and back pressure in order to achieve consistency. The flow compensator 850 may be eliminated if uniform flow is not required. Different mixing devices may be used. The scope of the invention should, therefore, be determined not with reference to the above description, but instead should be determined with reference to the appended claims along with their full scope of equivalents.

What is claimed is:

1. A turntable for rotating dough; comprising:
a circular turntable base, the turntable base having a bottom-side, and a top-side, and three slots axially extending from the center of the turntable base;
a center mount boss attached to the center of the bottom side;
a drive hub plate rotationally attached to the center mount boss and parallel to the turntable, the drive hub plate having three hub plate holes;
three spring linkages, each rotationally coupled to respective hub plate holes at a first end, each linkage including a linkage hole at a second end;
three gripper linkages, each being elongated and having a near-end and a far-end, with the near-ends located at respective hub plate holes, and including a linkage-mount which springingly mates with respective linkage holes such that a leveraging force is placed onto the far ends;
three grippers, each being elongated, each having a gripper-end and a connector-end, the connector-end connected to respective far-ends, the gripper ends slidably located within respective slots;
three ramp stops, each being ramp shaped, each being mounted on the bottom-side, wherein when the drive hub plate rotates to a first position each gripper rides up a respective ramp stop and is stopped such that the gripper-end does not protrude through the top-side, and when the drive hub plate rotates to a second position each gripper rides down such that the gripper-end protrudes from the top-side.

2. The turntable of claim 1, wherein the three axial slots are circumferentially distributed and pass through the turntable base.

3. The turntable of claim 2, wherein the slots are 120 degrees apart.

4. The turntable of claim 1, wherein the three hub plate holes are arranged in a bolt circle pattern about the center mount boss.

5. The turntable of claim 4, wherein the three hub plate holes are 120 degrees apart.

6. The turntable of claim 1, wherein the axis of the linkage holes are parallel to the turntable base.

7. The turntable of claim 1, wherein each the linkage mount is located between respective near-ends and far-ends.

8. The turntable of claim 1, wherein each gripper linkage additionally includes spring members coupled between respective near-ends and hub plate holes.

9. The turntable of claim 8, wherein each spring member places expansive force between respective near-ends and hub plate holes.

10. The turntable of claim 1, wherein each gripper includes a cross section that is dimensioned to freely pass through the slots.

11. The turntable of claim 1, wherein each gripper is positioned to be substantially perpendicular to the turntable base.

12. The turntable of claim 1, wherein each ramp stop is at least partially slotted to match the dimensions of the slots.

13. The turntable of claim 1, wherein each ramp is positioned near the outer-most portion of the turntable base and at an end of a slot.

14. The turntable of claim 13, wherein each ramp has an incline which begins nearer the center of the turntable.

15. The turntable of claim 1, wherein when all three grippers are in the second position, the grippers couple to a pizza pan.

16. The turntable of claim 15, wherein the grippers may additionally position to at least 4 different sizes of pizza pans.

* * * * *